United States Patent [19]

Tanaka et al.

[11] Patent Number: 5,396,391
[45] Date of Patent: Mar. 7, 1995

[54] MAGNETIC RECORDING SYSTEM PROVIDING A MAGNETIC HEAD HAVING OPPOSITE SIDES FOR APPLYING DIFFERENT MAGNETIC FIELD STRENGTHS TO A MAGNETIC RECORDING MEDIUM

[75] Inventors: Tsutomu Tanaka; Kazuyoshi Yamamori; Tamotsu Jitosho, all of Kanagawa, Japan

[73] Assignee: Kabushiki Kaisha Toshiba, Kawasaki, Japan

[21] Appl. No.: 805,035

[22] Filed: Dec. 11, 1991

[30] Foreign Application Priority Data

| Dec. 12, 1990 | [JP] | Japan | 2-410273 |
| Apr. 19, 1991 | [JP] | Japan | 3-088115 |
| Oct. 4, 1991 | [JP] | Japan | 3-257998 |
| Oct. 4, 1991 | [JP] | Japan | 3-257999 |
| Oct. 4, 1991 | [JP] | Japan | 3-258000 |
| Oct. 4, 1991 | [JP] | Japan | 3-258001 |
| Oct. 4, 1991 | [JP] | Japan | 3-258002 |

[51] Int. Cl.$^6$ ............................ G11B 5/127; G11B 5/02
[52] U.S. Cl. ........................................ 360/125; 360/110; 360/57
[58] Field of Search ................ 360/57, 125, 134, 126, 360/110

[56] References Cited

U.S. PATENT DOCUMENTS

| 4,442,159 | 4/1984 | Dezawa et al. | 360/134 X |
| 4,552,808 | 11/1985 | Fujiyama et al. | 360/134 X |
| 4,742,413 | 5/1988 | Schewe | 360/126 |
| 4,891,718 | 1/1990 | White | 360/46 |
| 4,931,886 | 6/1990 | Mallary | 360/125 X |

FOREIGN PATENT DOCUMENTS

| 0147963 | 7/1985 | European Pat. Off. |
| 59-96517 | 6/1984 | Japan |
| 63-55709 | 3/1988 | Japan |

OTHER PUBLICATIONS

Patent Abstracts of Japan, vol. 12, No. 170 (P-705) (3017), May 20, 1988, & JP-A-62-281-107, Dec. 7, 1987, T. Mimori, "Vertical Recording Head".
Patent Abstracts of Japan, vol. 8, No. 214 (P-304) (1651), Sep. 29, 1984, & JP-A-59-096-517, Jun. 4, 1984, T. Ichikawa, et al., "Magnetic Recording and Reproducing Method".
Patent Abstracts of Japan, vol. 12, No. 276 (P-737) (3123), Jul. 30, 1988, & JP-A-63-055-709, Mar. 10, 1988, N. Nishimura, "Head for Perpendicular Magnetic Recording".
Patent Abstracts of Japan, vol. 8, No. 204 (P-301) (1641), Sep. 18, 1984, & JP-A-59-087-612, May 21, 1984, I. Saitou, et al., "Vertical Magnetic Recording System".
IEEE Transactions on Magnetics, vol. 26, No. 5, 1990; "Perpendicular Recording with a One-Sided Mig--Head on Single-Layer Co-Cr"; H. A. J. Cramer, et al.

*Primary Examiner*—Aristotelis Psitos
*Assistant Examiner*—Jennifer Pearson
*Attorney, Agent, or Firm*—Oblon, Spivak, McClelland, Maier, & Neustadt

[57] ABSTRACT

A magnetic recording system for recording information on a magnetic recording medium magnetized with a perpendicular magnetization component by a magnetic recording head so as to be reproduced by a magnetic reproducing head, the magnetic recording head including a leading side and a trailing side opposite to the leading side, the leading side leading the trailing side in terms of motion relative to the magnetic recording medium, the magnetic recording head generating a first magnetic field with a field strength from the leading side to the magnetic recording medium, and generating a second magnetic field from the trailing side to the magnetic recording medium, a field strength of the second magnetic field being smaller than that of the first magnetic field.

4 Claims, 18 Drawing Sheets

MAGNETIC RECORDING SYSTEM PROVIDING A MAGNETIC HEAD HAVING OPPOSITE SIDES FOR APPLYING DIFFERENT MAGNETIC FIELD STRENGTHS TO A MAGNETIC RECORDING MEDIUM

BACKGROUND OF THE INVENTION

1. Field of the Invention

This invention relates to a magnetic recording system for recording information on magnetic recording media such as a magnetic disk, a magnetic tape and the like.

2. Description of the Prior

Magnetic recording technology has been widely utilized as a basic technique for recording a large amount of information in the external memory devices of a computer, a VTR, a DAT and the like.

In the conventional magnetic recording system, a longitudinal recording technique has been employed in which a remanent magnetization is formed in a direction parallel to the magnetic layer of a magnetic recording medium.

However, in the longitudinal recording system, as the linear density (the recording density per unit length) increases, the remanent magnetization decreases due to a demagnetization effect. Because of this phenomenon, the recording density cannot be sufficiently increased.

To minimize the above-described disadvantages in the longitudinal recording system, a perpendicular recording system, in which the remanent magnetization is formed in a direction perpendicular to the magnetic layer plane, has been developed and applied to practical applications.

As for digital recording, the difference between the longitudinal recording system and the perpendicular recording system will be described in the following manner.

In the longitudinal recording system, as shown in FIG. 22(a), a repulsion force acts on the adjacent portions of the magnetization in a transition region. This is equivalent to a condition in which the demagnetization of the medium increases to a maximum at a transition point in the transition region. As a result, the magnetization decreases to a minimum at the transition point. In the longitudinal recording system, as the recording density becomes higher, the average demagnetization increases. Thus, in the longitudinal recording system, if the recording density is increased, a sufficient reproduced output can no longer be obtained. This inevitably restricts an increase of the recording density. In the perpendicular recording system, as shown in FIG. 22(b), the demagnetization decreases to a minimum in the transition region, and an attraction force acts on the adjacent portions of magnetization. As the recording density becomes higher the average demagnetization decreases. As a result, the enhancement of the recording density is basically not limited by the demagnetization. Therefore, the perpendicular recording system has been recognized as a recording system suitable essentially for high-density recording.

In general, when a conventional ring-type reproducing head is used, the reproduced waveform in the longitudinal recording system differs significantly from the reproduced waveform in the perpendicular recording system.

Further, when digital recording is performed in the longitudinal recording system, a reproduced waveform P1 is obtained, as shown in FIG. 23(a). In FIG. 23(a), a single-peak pulse is generated with respect to the isolated transition of the magnetization. The peak of this pulse corresponds substantially to the magnetization-transition point A. Thus, the reproduction of information in the conventional longitudinal recording system has been performed in the following manner, the reproduced waveform is electrically differentiated, and then the zero-crossing point of the thus obtained differential waveform is detected.

Further, the actual waveform of the single-peak isolated reproduced waveform is not completely symmetrical and, accurately observed, its peak slightly deviates from the information-recorded point. This reduces the reproducing margin in the case of the high-density recording.

In the case when digital recording is performed in the perpendicular recording system, a reproduced waveform P2 is obtained, as shown in FIG. 23(b). A double-peak pulse is generated with respect to the magnetization-transition point A. Thus, theoretically, the reproduced waveform need not be differentiated for recovering the recorded information, i.e., only the detection Of the zero-crossing point O of the reproduced waveform is needed.

In practice, even when the perpendicular magnetic recording is performed, not only the perpendicular magnetization component is formed in the medium, but the longitudinal magnetization component is formed in the medium. Thus, the reproduced waveform can become a distorted pulse P3, as shown in FIG. 23(c), i.e., the zero-crossing point O of the reproduced waveform inevitably deviates from the magnetization-transition point A.

To solve the above-described disadvantage in the perpendicular magnetic recording system, various signal-processing systems have been disclosed; e.g., a system in which a Hilbert filter is used (reference: B. J. Langland and M. G. Larimore, "Processing of Signals from Media with Perpendicular Magnetic Anisotropy", IEEE Trans. on Magn. vol. MAG-16, No.15, 1980 and B. J. Langland, "Phase Equalization for Perpendicular Recording", IEEE Trans. on Magn. vol. MAG-18, No.6, 1982), a double-differential system (reference: N. Aoyama, et al., "Bit Error Rate Characteristics for a Co—Cr—Ta Single Layer Perpendicular Recording Medium", J. of Magn. Soc. of Japan vol. 13, Supplement No. S1, 1989), a delayed signal-superimposing system (reference: T. Okuwaki, et al., "5.25-Inch Floppy Disk Drive Using Perpendicular Magnetic Recording", IEEE Trans. on Magn. Vol. MAG-21, No.5, 1985) etc.

However, there is no system in which the essential remanent magnetization state per se has been improved.

Further, such signal-processing systems usually employ delay lines which are costly and cannot be easily miniaturized. Therefore, such systems are not suitable for practical applications.

SUMMARY OF THE INVENTION

Accordingly, one object of the present invention is to provide a magnetic recording system which can perform superior high-density recording and also can detect information easily and accurately.

Another object of the present invention is to provide a novel magnetic recording system in which an ideal symmetrical single-peak reproduced waveform with respect to a single isolated magnetization-transition can be assuredly obtained.

Briefly, in accordance with one aspect of the present invention, there is provided a magnetic recording system for recording information on a magnetic recording medium having a perpendicular magnetization component by using a ring head. The recording system includes means for causing the magnetic field strength on the leading side of the ring head to have a difference from the magnetic field strength on the trailing side of the ring head, the difference being determined in such a manner that a reproduced waveform becomes a single-peak waveform.

Specifically, the magnetic field strength on the leading side is caused to be greater than the magnetic field strength on the trailing side, and the recording current of the ring head is controlled, so that a single-peak reproduced waveform can be easily obtained. In this case, significant advantages can be obtained when a magnetic recording medium having a coercive force of 600 Oe at a minimum and a perpendicular squareness ratio of 0.5 at a minimum is used. Further, a medium having a magnetic layer including an hexagonal system magnetic powder as a major component is most suitable. Further, the thickness of this magnetic layer is preferred to be greater than a value obtained by subtracting 0.2 $\mu$m from the gap between the leading side and the trailing side of the ring head.

Moreover, according to the present invention, the reproduced waveform parameter ($\theta$) can be maintained in a range of $-20°$ through $+20°$.

In accordance with another aspect of the present invention, there is provided a magnetic recording device for recording information on a magnetic recording medium having a perpendicular magnetization component by using a ring head comprising two cores and a coil wound therearound, one of the cores having a leading side and the other core having a trailing side, the leading side and the trailing side being disposed to oppose each other across a prescribed gap. The ring head is structured such that the magnetic field strength to be generated on the leading side is caused to have a difference from the magnetic field strength to be generated on the trailing side, and means are provided for determining the difference of the magnetic field strength in such a manner that a reproduced waveform of the magnetization to be recorded on the magnetic recording medium becomes a single-peak waveform.

The difference of the magnetic field strength can be obtained in the following manner. Specifically, the magnetic field strength on the leading side is determined to be greater than the magnetic field strength on the trailing side. Further, a member having a saturated magnetic flux density greater than that of the trailing side is disposed on the leading side.

Further, when the recording current is varied in accordance with frequencies to be recorded, the magnetic recording can be performed more accurately.

Moreover, according to the present invention, recording in the conventional manner can be performed interchangeably with the recording in the manner of this invention while using the ring head of this invention. Specifically, not only the recording in the manner of this invention, but also the recording in the conventional manner can be interchangeably performed by merely changing the relative running direction of the ring head with respect to the medium while the ring head of this invention is being used.

More specifically the magnetic recording device of this invention comprises discriminating means for discriminating a recording type specification of the magnetic recording medium, and means for causing the trailing side to run earlier than the leading side in relative movement with respect to the magnetic recording medium depending on the output produced from the discriminating means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 24 is a cross-sectional view illustrating another embodiment according to the present invention.

DESCRIPTION OF THE PREFERRED EMBODIMENTS

Figure 1A:
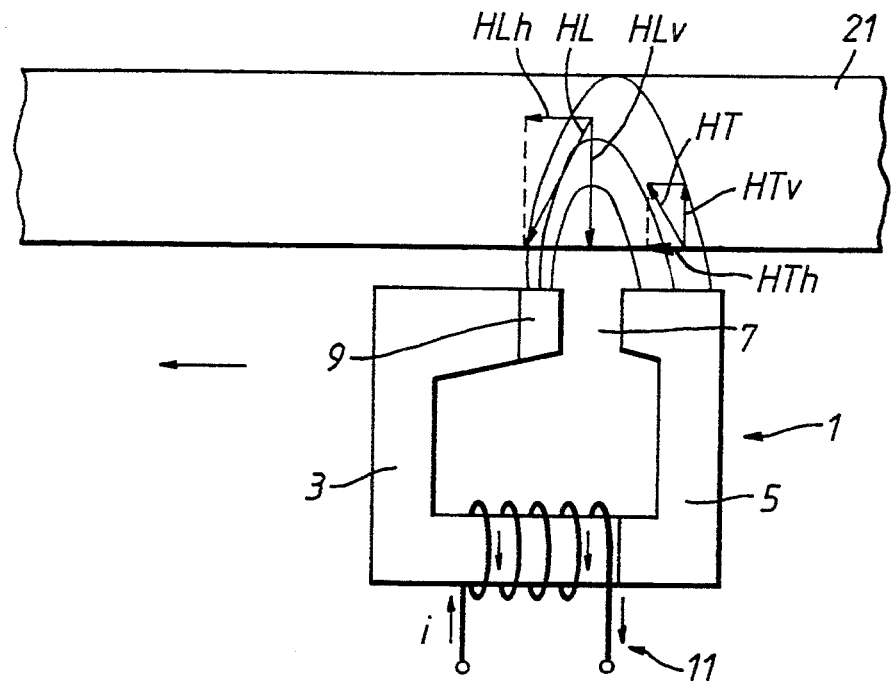
FIGS. 1(a) and 1(b) are diagrams for explaining the operation of the magnetic recording system according to the present invention.

Hereinafter, the embodiments according to the present invention will be described with reference to the accompanying drawings.

The inventors of this invention have conducted experiments of various kinds so as to achieve superior high-density recording. As a result, the inventors have discovered that the recording system according to the present invention can perform the high-density recording such that a sufficient reproduced output can be obtained. Further, a single-peak reproduced waveform, which is more-symmetrical and sharper than the reproduced waveform obtained in the conventional longitudinal recording system, can be realized without the use of complicated signal-processing devices.

In addition, even when a perpendicular magnetic recording medium having a low perpendicular squareness ratio is used, a satisfactory reproduced waveform can be obtained in the recording system according to the present invention.

In a conventional magnetic recording system, the magnetization state of a magnetic recording medium is determined on the trailing edge side of a magnetic head (trailing edge: edge on the side which operates later in time in terms of relative running with respect to the medium).

However, the magnetic recording system of this invention is a novel magnetic recording system in which a remanent magnetization state is determined in such a manner that both the leading edge (leading edge: edge on the side which operates earlier in time in terms of relative running with respect to the medium) and the trailing edge of a ring head operate complementarily.

This is significantly advantageous in that a single-peak reproduced waveform can be invariably obtained regardless of the types of reproducing ring heads used in the reproducing system. Specifically, a reproduced waveform, which is peculiar to the reproduced waveform obtained from a longitudinal magnetic recording medium, can be obtained even from a perpendicular magnetic recording medium when the medium has been magnetized by use of the system of this invention.

The operation of the magnetic recording system according to the present invention will be described with reference to FIG. 1. In FIGS. 1(a) and 1(b), a ring head 1 comprises a leading core 3 having a coil 11 wound therearound, a trailing core 5, a head gap 7 for magnetic recording and a member 9 having a high saturation magnetic flux density. The head gap 7 is formed between the trailing core 5 and the leading core 3 with the member 9. The member 9 can generate a magnetic field having magnetic field strength greater than the leading core 3.

Figure 1B:
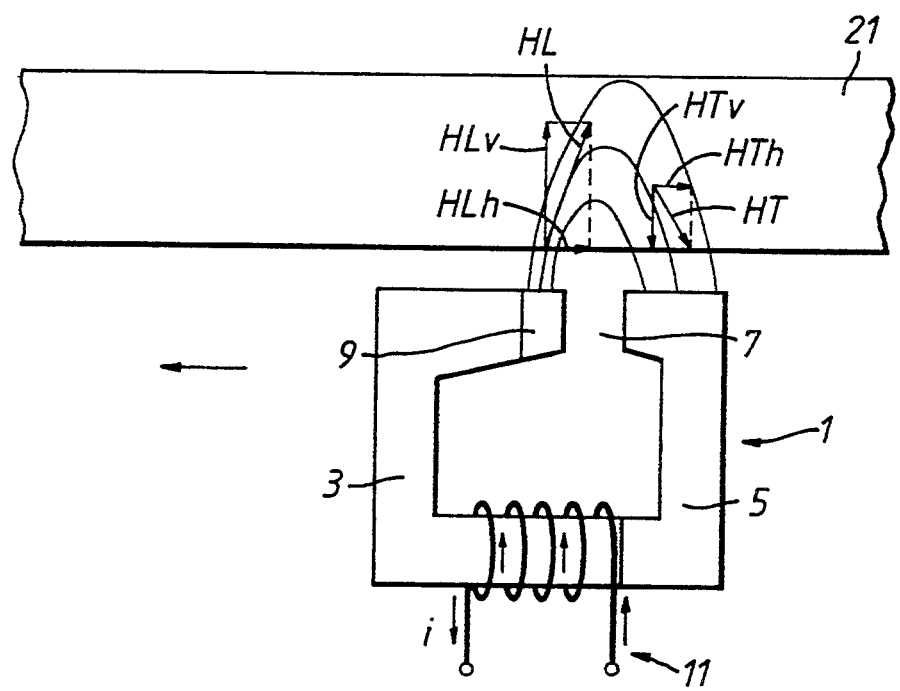

As shown in FIG. 1(a), when a recording current (i) is applied to the coil 11, a head vector magnetic field (leading field) HL, whose magnetic field strength is great, is generated on the leading edge side of the head gap 7. When a magnetic medium 21 passes through the leading edge of the head gap 7, ramanent magnetization having not only a longitudinal component but also a perpendicular component is formed in the medium 21 by the effect of the head vector magnetic field (leading field) HL.

Thereafter, as the medium 21 runs, the magnetization receives the effect of a trailing field HT on the trailing edge side.

However, the magnetic field strength on the trailing edge side, i.e., the trailing field HT is smaller than the field strength on the leading edge side, i.e., the leading field HL. Thus, the magnetization, which has been determined on the leading edge side, is modified to some extent. More specifically, the direction of the longitudinal component HTh of the trailing field HT on the trailing edge side and the direction of the longitudinal component HLh of the leading field HL on the leading edge side are equal to each other. However, the directions of the perpendicular components HTv and HLv of the respective trailing fields HT and leading fields HL are opposite to each other. Thus, the perpendicular component of the remanent magnetization is weakened, and the longitudinal component of the remanent magnetization is strengthened.

As described above, while the ring head 1 is being excited with a constant direction current, the perpendicular component of the remanent magnetization is weakened.

However, at the instant of the magnetization-transition, the following phenomenon occurs and is explained with reference to FIG. 1(b). Specifically, the direction of the head-exciting current is reversed immediately before the remanent magnetization, which has been formed in the vicinity of the leading edge side, reaches the trailing edge side.

As a result of this phenomenon, the respective directions of the longitudinal component HTh and the perpendicular component HTv are reversed. In other words, as compared to the leading field HL before the reverse of the direction of the head-exciting current, the direction of the longitudinal component HTh is reversed, and the direction of the perpendicular component HTv is not reversed. This means that in the magnetization-transition region, the perpendicular component HTv is strengthened, and the longitudinal component HTh is weakened. Thus, the greater perpendicular magnetization can be formed in the magnetization-transition region.

Further, besides the above-described explanation, the advantages of this invention can also be explained in the following manner.

Figure 2A:
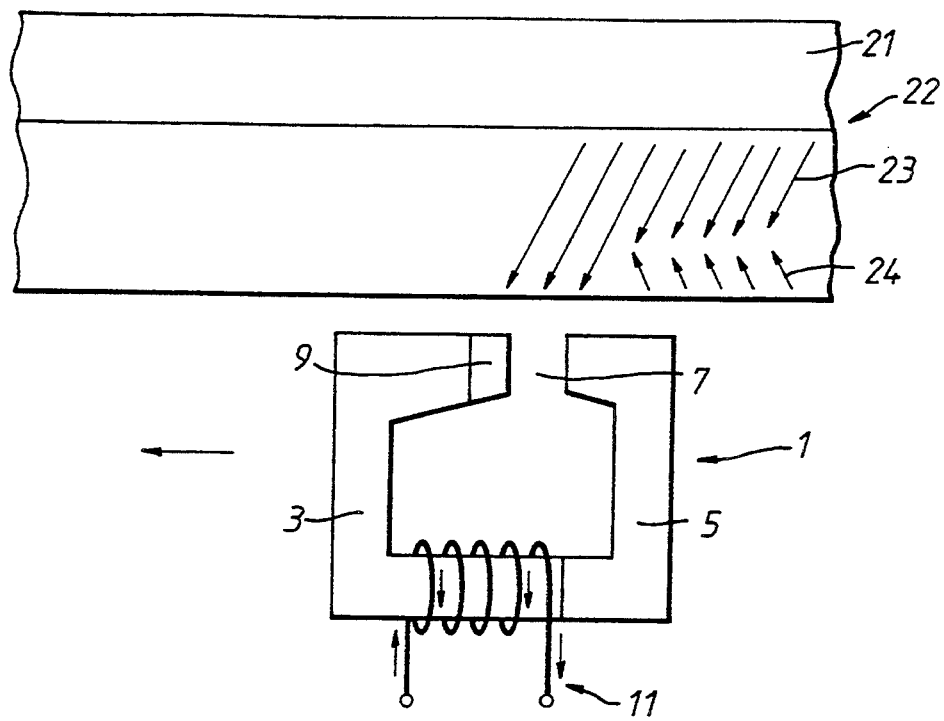
FIGS. 2(a) and 2(b) are diagrams for explaining the operation of the magnetic recording system according to the present invention.

As shown in FIG. 2(a), when a recording current (i) is applied to a coil 11, remanent magnetization is formed in a direction of the leading field HL on the leading edge side of a head gap 7. More specifically, the remanent magnetization is formed, by the effect of the greater leading field HL, into a deeper layer 23 of the medium 21.

Thereafter, as the medium 21 runs, the magnetization receives the effect of the trailing field HT on the trailing edge side, and only the surface layer portion 24 of the magnetic layer 22 of the medium 21 is magnetized in the direction of the trailing field HT on the trailing edge side.

Figure 2B:
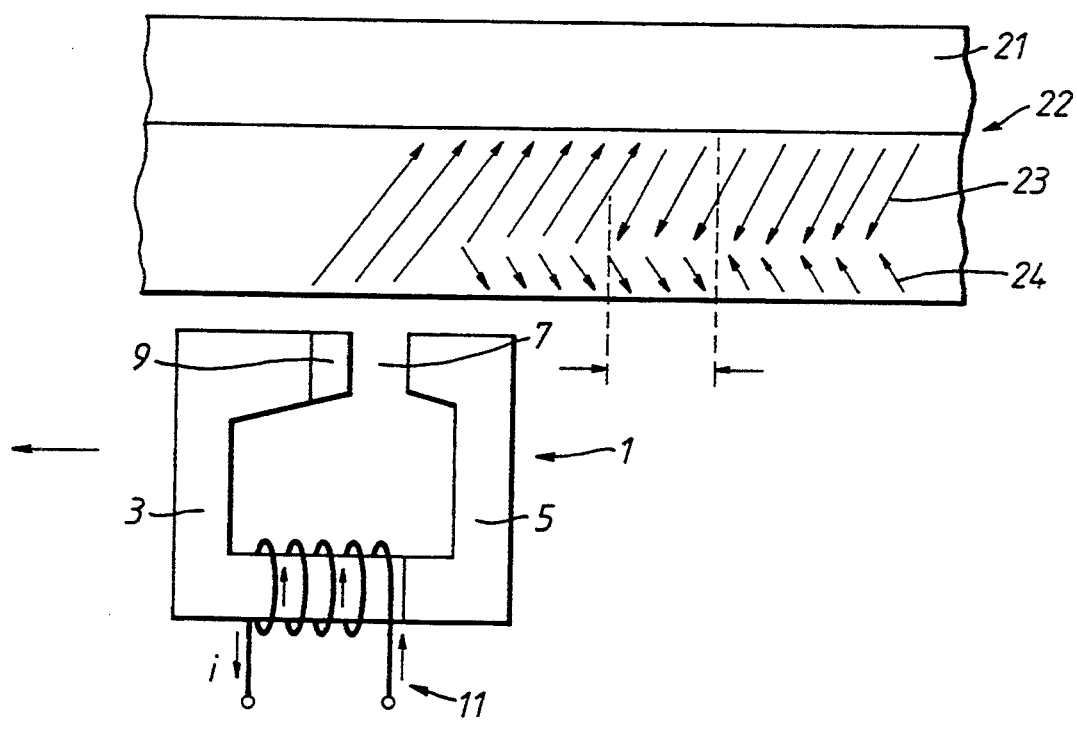

However, as illustrated in FIG. 2(b), when the direction of the head-exciting current is reversed, the following phenomenon occurs in the magnetization-transition region. Specifically, because of the time difference of the arrival of the leading edge and the trailing edge, the direction of the perpendicular magnetization component in the deeper layer region 23 of the medium 21 coincides with the direction of the perpendicular magnetization component in the surface layer region 24 of the medium 21.

As a result of this phenomenon, the greater perpendicular magnetization can be formed in the magnetization-transition region.

The above-described explanation will be explained in more detail with reference to FIGS. 3(a) through 3(b), wherein the relationship between the remanent magnetization and the reproduced output waveform is illustrated.

Figure 3A:
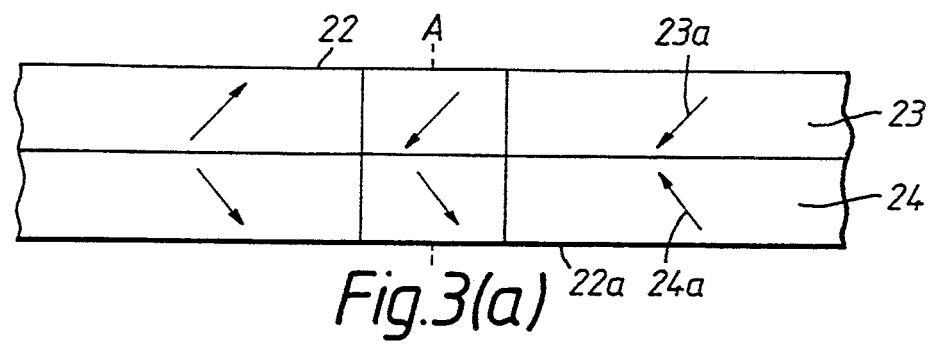
FIGS. 3(a) through 3(d) are diagrams for explaining the operation of the magnetic recording system according to the present invention.
Figure 3B:
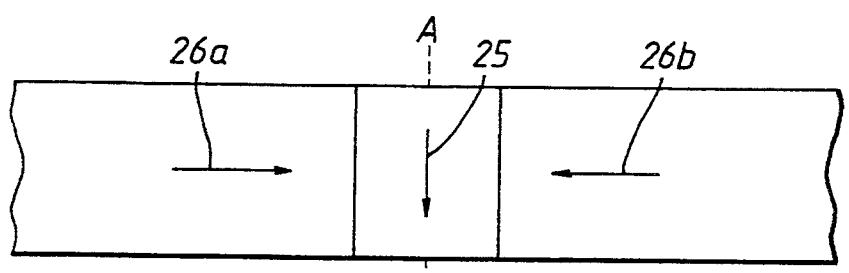

FIG. 3(a) schematically illustrates the magnetization shown in FIG. 2(b). Specifically, the deeper layer portion 23 of the magnetic layer 22 is magnetized under the control of the magnetic field on the leading edge side. The inclination of the magnetization 23a is in the first quadrant (the third quadrant) with respect to the magnetic layer plane 22a. The surface layer portion 24 is magnetized under the control of the magnetic field on the trailing edge side. The inclination of the magnetization 24a is the second quardrant (the fourth quardrant). In other words, the direction of the magnetization 23a intersects the direction of the magnetization 24a.

Figure 3C:
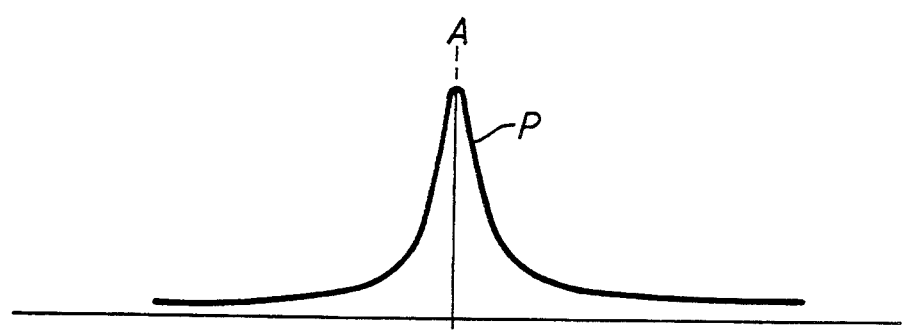

This means that depending on the combination of the directions of the magnetization 23a and the magnetization 24a, the remanent magnetization can be determined to be either state of (a) or (b) as follows:

(a) the longitudinal magnetization components combine to strengthen each other, and the perpendicular magnetization components combine to weaken each other;

(b) the longitudinal magnetization components combine to weaken each other, and the perpendicular magnetization components combine to strengthen each other. Assume that the remanent magnetization is formed in a well-balanced state, i.e., in such a state that the effect of the ramanent magnetization of the deeper layer portion 23 becomes substantially equal to the effect of the remanent magnetization of the surface layer portion 24. In this case, the apparent directions of-the magnetization components of the magnetic layer observed from the reproducing head become the directions shown in FIG. 3(b). More specifically, in FIG. 3(b), a perpendicular magnetization component 25 is formed in a magnetization-transition region A. Further, longitudinal magnetization components 26a and 26b are arranged so as to sandwich the perpendicular magnetization component 25. As a result, a steeper single-peak reproduced waveform P can be obtained, as shown in FIG. 3c. The peak point of the waveform P coincides with the information point.

Figure 3D:
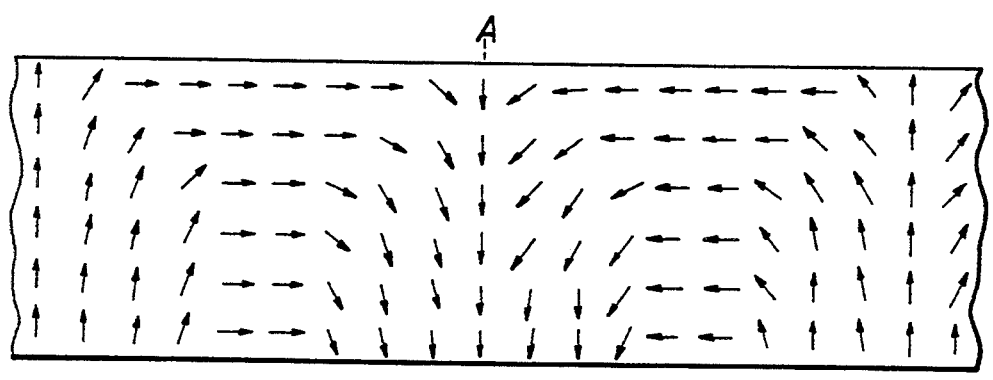

As can be predicted from the above-described explanation, the remanent magnetization, which is substantially equally to an ideal horseshoe-shaped magnetization, can be formed in the medium by use of the system of this invention, as shown in FIG. 3(d).

Moreover, in some cases, the deeper layer portion and the surface layer portion may not be clearly divided. However, the demagnetization in the magnetization-transition region can be assuredly minimized by use of the system of this invention. Thus, as the recording density increases, the demagnetization decreases. As a result, the high-density recording is particularly advantageous to the system of this invention.

Further, the remanent magnetization of the sufficient perpendicular components can be formed only in the magnetization-transition region of the medium. Thus, a symmetrical steep single-peak waveform can be reproduced with minimal waveform distortion.

The above-described advantages of the present invention have been confirmed by various kinds of experiments. Further, the operation of the present invention can be supported by the above-described reasons.

Figure 4:
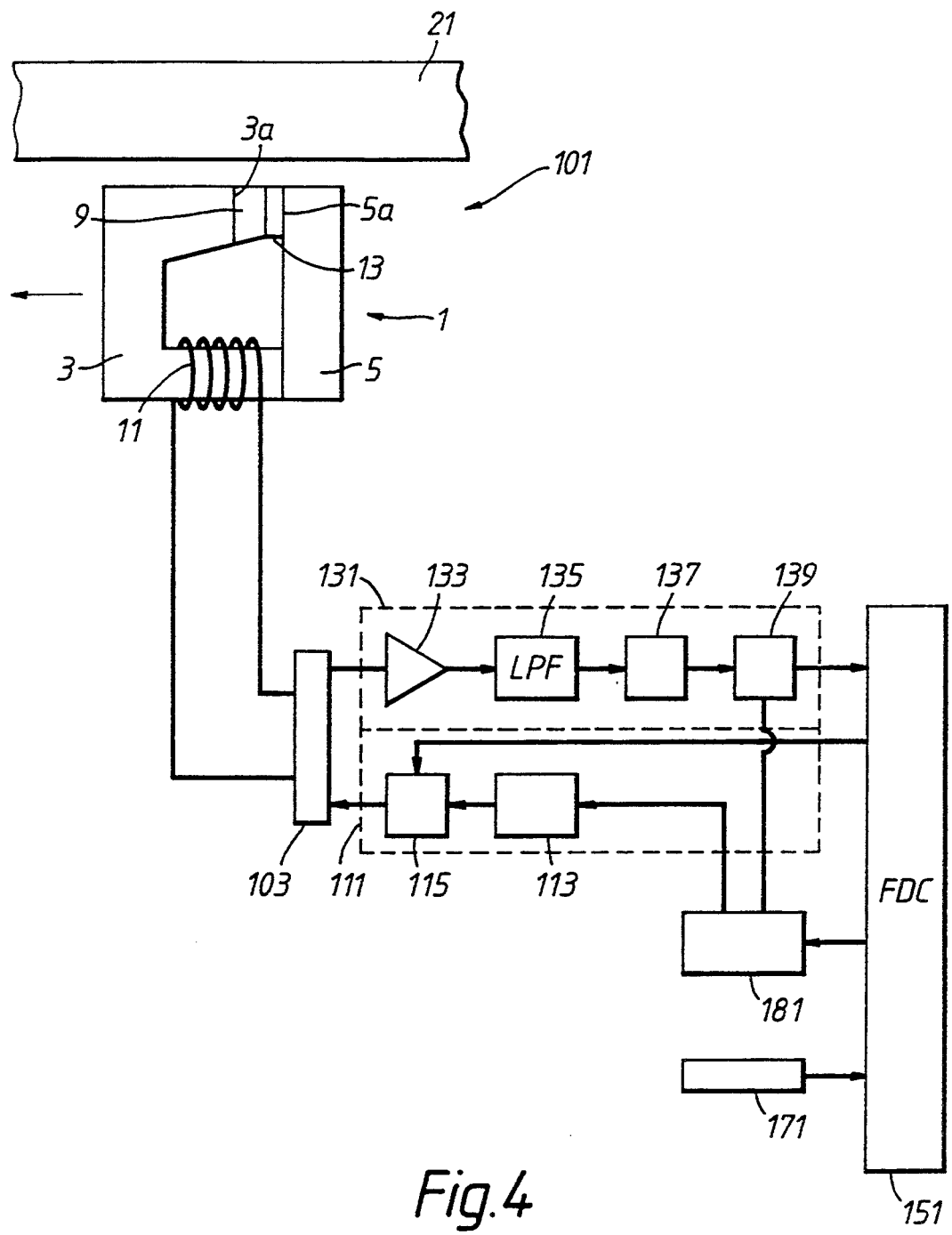
FIG. 4 is a diagram for explaining a magnetic recording system of one embodiment according to the present invention.

FIG. 4 is a diagram illustrating a floppy disk-driving device for realizing a magnetic recording system of one embodiment according to the present invention.

In FIG. 4, a floppy disk-driving device (hereinafter referred to as FDD) 101 comprises a magnetic head 1 for recording and reproducing, and a head-switching circuit 103 for selectively connecting magnetic head 1 to a recording circuit 111 or to a reproducing circuit 131. The recording circuit 111 and the reproducing circuit 131 are connected to a floppy disk controller (hereinafter referred to as FDC) 151.

Further, a switching circuit 181, and sensor means 151 for discriminating the specification of a magnetic disk 21 (e.g., whether for longitudinal recording or for perpendicular recording) are respectively connected to the FDC 151. The signals produced from the switching circuit 181 are respectively fed into the recording circuit 111 and the reproducing circuit 131. The recording circuit comprises a recording current-supplying circuit 113 and a recording signal-processing circuit 115. In accordance with the signal from the switching circuit 181, the recording current-supplying circuit 113 selects a DC current of a prescribed level from plural kinds of DC currents having different levels, and supplies the selected DC current to the recording signal-processing circuit 115. The circuit 115 receives a recording signal having a TTL level from FDC 151, and modulates the received signal into a prescribed signal.

The reproducing circuit 131 comprises a preamplifier 133 connected to the head-switching circuit 103, a low pass filter (hereinafter referred to as LPF) 135, a peak detector 137, and a time domain filter 139. Specifically, LPF 135 is connected to the preamplifier 133 so as to eliminate noise components. The peak detector 137 is connected to LPF 135, and serves to detect a differential zero-crossing point and to convert the detected signal into a signal having a TTL level. Further, in accordance with a signal from the switching circuit 181, the time domain filter 139 removes external noises or extra pulses on the shoulder of the reproduced output waveform received from the peak detector 137. The FDD 101 discriminates the specification of the magnetic disk 21, and feeds the specification of the magnetic disk 21 into FDC 151. The signal produced from FDC 151 is fed through the switching circuit 181 into the recording current-supplying circuit 113. In accordance with this signal, the recording current-supplying circuit 113 selects a DC current of 18 mA, which is one of plural predetermined DC currents. Further, on the basis of the selected DC current, the recording signal-processing circuit 115 modulates a TTL-level signal received from FDC 151, and feeds the modulated signal through the head-switching circuit 103 into magnetic head 1. As a result, information is recorded on the magnetic disk 21.

The leading edge side of the gap 13 of magnetic head 1 is constituted by a member having a saturation magnetic flux density higher than that of the trailing edge side. Thus, when a recording current (i) is determined to be a prescribed value, the reproduced waveform becomes a single-peak waveform.

As a result, the recording current (i) can be adjusted so as to obtain the optimum reproduced waveform such that the phase difference ($\theta 2n - 1$) between the fundamental and the respective n-order harmonics becomes 0.

Next, the case when information, which has been recorded by use of the above-described FDD 101, is reproduced by the same FDD 101 will be described.

The information, which has been recorded on the magnetic recording medium 21, is read by the magnetic head 1, and the read information is fed through the head-switching circuit 103 into the reproducing circuit 131. In this case, the waveform of the information fed into the reproducing circuit 131 has been a longitudinal waveform. This is because the information has been recorded by use of the prescribed recording current which can achieve a single-peak waveform, i.e., a longitudinal waveform.

This longitudinal waveform is amplified by the preamplifier 133, and the noise components thereof are removed by LPF 135. Further, the differential zero-crossing point of the waveform is detected, and then converted into a TTL level by the peak detector 137. Further, the external noises or extra pulses on the shoulder of the reproduced output are removed by the time domain filter 139, and then the reproduced output is fed into FDC 151.

In one example, the magnetic recording medium 21 was of a 3.5-inch magnetic disk having a magnetic layer including plate-shaped barium-ferrite magnetic powder (hexagonal shape magnetic powder) dispersed in a bonding resin. The perpendicular squareness ratio (SQR) of the magnetic disk was 0.75, and the coercive force Hc thereof was 1400 Oe. Further, the thickness of the magnetic layer was 1.9 $\mu$m.

The magnetic head 1 was of a ring-type magnetic head comprising a first I-shaped ferrite core 5, a second C-shaped ferrite core 3, and a read/write coil 11 being wound around the second ferrite core 3. The head 1 further comprises an alloy film 9 of Fe, Si and Al as a high saturation magnetic flux density material, the alloy being adhered to an edge side 3a of the second ferrite core 3. Further, the head 1 comprises a 0.40-$\mu$m nonmagnetic gap member 13 disposed between an edge side 5a of the first ferrite core 5 and the alloy film 9.

The second ferrite core 3 having the alloy film 9 adhered thereto was arranged to run earlier in time than the first ferrite core 5 in terms of relative movement with respect to the recording medium 21.

The magnetic disk 21 was rotated at a speed of 300 r.p.m. and the isolated-transition was recorded by use of the above-described magnetic recording system.

Figure 5A:
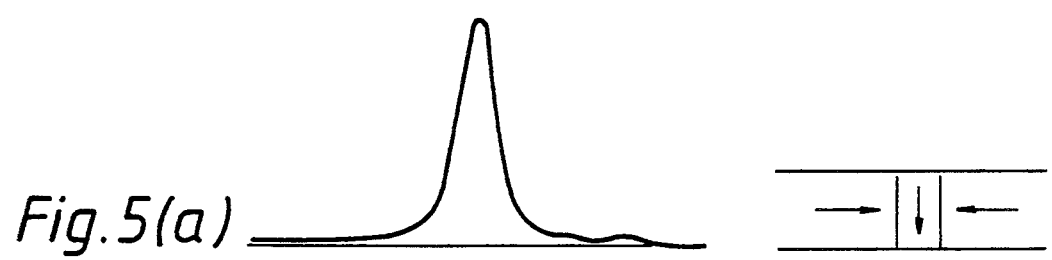
FIGS. 5(a) through 5(c) are diagrams respectively illustrating the waveforms in the magnetic recording system of one embodiment according to the present invention.
Figure 5B:
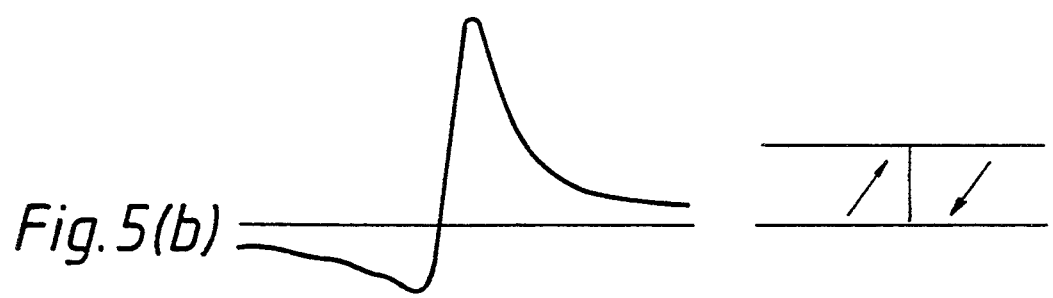
Figure 5C:
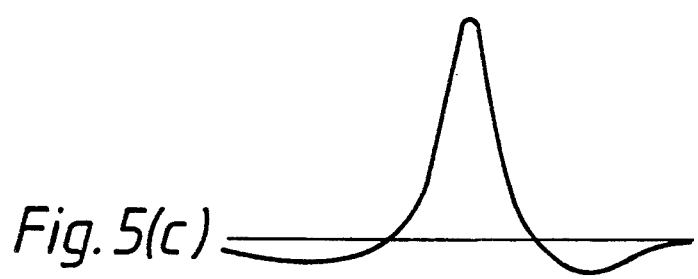

FIGS. 5(a) through 5(c) show the reproduced waveforms obtained by reproducing the isolated-transition waveform. FIG. 5(a) shows the directions of magnetization recorded on the medium by use of the magnetic recording system according to this embodiment, and also shows the reproduced waveform of the isolated transition. FIGS. 5(b) and 5(c) are prepared for the sake of comparison.

FIG. 5(b) shows the directions of magnetization recorded on the medium by use of a conventional magnetic recording system in which a magnetic head having an alloy film adhered to the trailing edge side and the same gap as in this embodiment was used, and also shows the reproduced waveform obtained by reproducing the isolated transition. FIG. 5(c) shows the reproduced waveform obtained after the signal processing such that the signal shown in FIG. 5(b) was processed by use of the Hilbert filter having a 4-tap delay line.

As can be seen from FIG. 5(a), the single-peak reproduced waveform having substantially complete symmetry was obtained by use of the system of this embodiment despite the use of the medium having a perpendicular squareness ratio of 0.75 from which a rather perpendicular reproduced waveform would be generally obtained.

Moreover, this result is completely independent of asymmetry in terms of the sensitivity function of the reproducing process or reproducing head. This means that a symmetrical single-peak reproduced waveform can invariably be obtained regardless of the types of reproducing heads. Specifically, the operation of this invention extends to the magnetization mechanism. Thus, the magnetic recording system of this invention differs essentially from the conventional system in which a double-peak reproduced waveform is converted into a single-peak waveform by use of a signal-processing device. In other words, according to the present invention, the magnetization per se in the medium is changed into a state from which a single-peak waveform can be reproduced.

Further, as can be seen from FIG. 5(a), the magnetization state, from which a longitudinal (a single-peak) waveform can be obtained, has been established. Moreover, there can be observed a significantly sharp transition equivalent to the magnetization transition which has occurred in the perpendicular magnetization.

Dependence Characteristics upon Recording Current

In the above-described magnetic recording system according to the present invention, the magnetic recording was performed by changing the values of the recording current.

Figure 6:
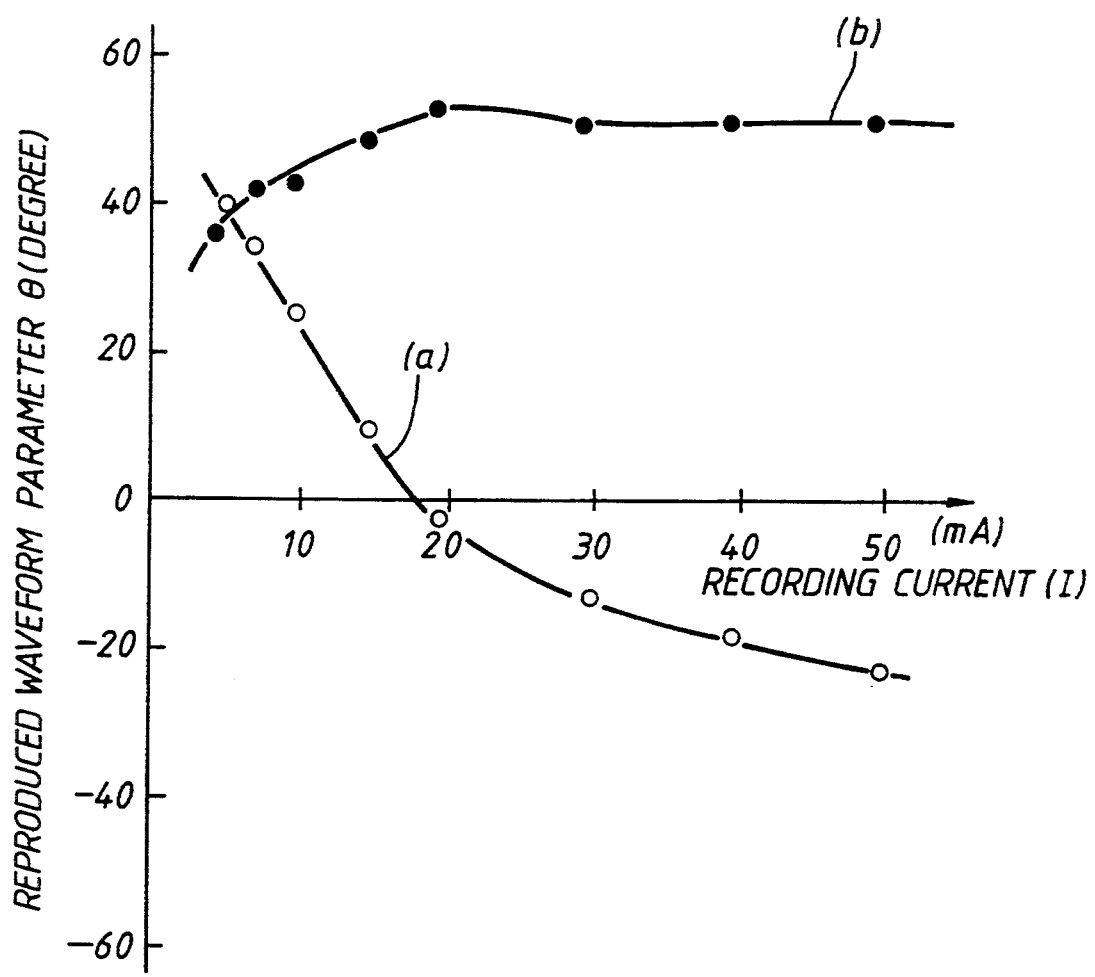
FIG. 6 is a graph illustrating the recording current (I) versus reproduced waveform parameter ($\theta$) characteristics, where the ordinate represents the reproduced waveform parameter ($\theta$) and the abscissa represents the recording current (I)

FIG. 6 shows the dependence characteristics of the reproduced waveform parameter ($\theta$) upon the recording current (I). In FIG. 6, the ordinate represents the reproduced waveform parameter ($\theta$), and the abscissa represents the recording current (I). Further, the curve (a) indicates the case when the magnetic recording was performed with a recording density of 5K FRPI by use of the system of this invention, and the curve (b) indicates the case when the magnetic recording was performed with a recording density of 5K FRPI by use of a conventional system.

The reproduced waveform parameter ($\theta$) was obtained in the following manner. Specifically, the reproduced waveform is processed by use of a Fourier transformation. Thereafter, a time axis is determined such that the term of the fundamental sine wave becomes zero. Again, a Fourier transformation is performed so as to develop the results into a cosine function in which a phase shift occurs. In general, it has been confirmed that the phase shift which approximates to $(2n-2)\cdot\theta$ is included in the term of $(2n-1)$ order. If $\theta=0°$, an ideal single-peak longitudinal waveform can be obtained. If $\theta=90°$, a double-peak perpendicular waveform can be obtained. Further, when $\theta$ is a value between 0° and 90°, longitudinal waveform and perpendicular waveform are mixed in the reproduced waveform. (reference: Yamamori, Tanaka, et al. "Recording Characteristics for Perpendiculary Oriented Ba-Ferrite Media", Institute of Electronics, Information and Communication; Magnetic Recording Research Material MR 89-5 (in Japanese), K. Yamamori, T. Tanaka and H. Mori, "Orientation effects of Barrium ferrite media", proceedings of PMRC '89, pp881–886, 1989 (J. of The Magnetics Society) of Japan, vol. 13, Supplement, no. Sl, 1989).

As can be seen from FIG. 6, in the conventional system (curve (b)), the reproduced waveform parameter ($\theta$) is substantially constant with respect to the recording current I. However, in the system of this invention (curve (a)), the reproduced waveform parameter ($\theta$) can be selectively obtained. Specifically, in the system of this invention, a single-peak longitudinal waveform can be obtained when the value of the recording current (I) is determined to be 18 mA.

Naturally, in practice, the recording current (I) need not be determined such that $\theta=0°$. In other words, the tolerance of ($\theta$) may be determined on the basis of the margin of the device to be used. In practice, even in the conventional so-called longitudinal recording system, as described above, the complete symmetrical isolated waveform is not generated. The reproduced waveform parameter ($\theta$), which has been discussed, is in a range of 10° through 30°.

As described above, in the system of this invention, the reproduced waveform parameter ($\theta$) of harmonics with respect to the fundamental can be selectively determined by changing the value of the recording current (I). When the recording current (I) is determined in such a manner that the reproduced waveform parameter ($\theta$) becomes 0°, a significantly sharp single-peak waveform can be reproduced.

Dependence Characteristics of Reproduced Output upon Recording Density

In general, when higher-density recording is performed by use of the conventional longitudinal magnetic recording system, the effect of demagnetization becomes so much greater that a higher reproduced output cannot be obtained. However, in the system of this invention, when magnetic recording is performed in such a manner that the reproduced waveform parameter ($\theta$) becomes 0°, the reproduced output is not significantly decreased in its higher-density region despite the longitudinal waveform. This means that the perpendicular-magnetization recording has been essentially achieved.

Figure 7:
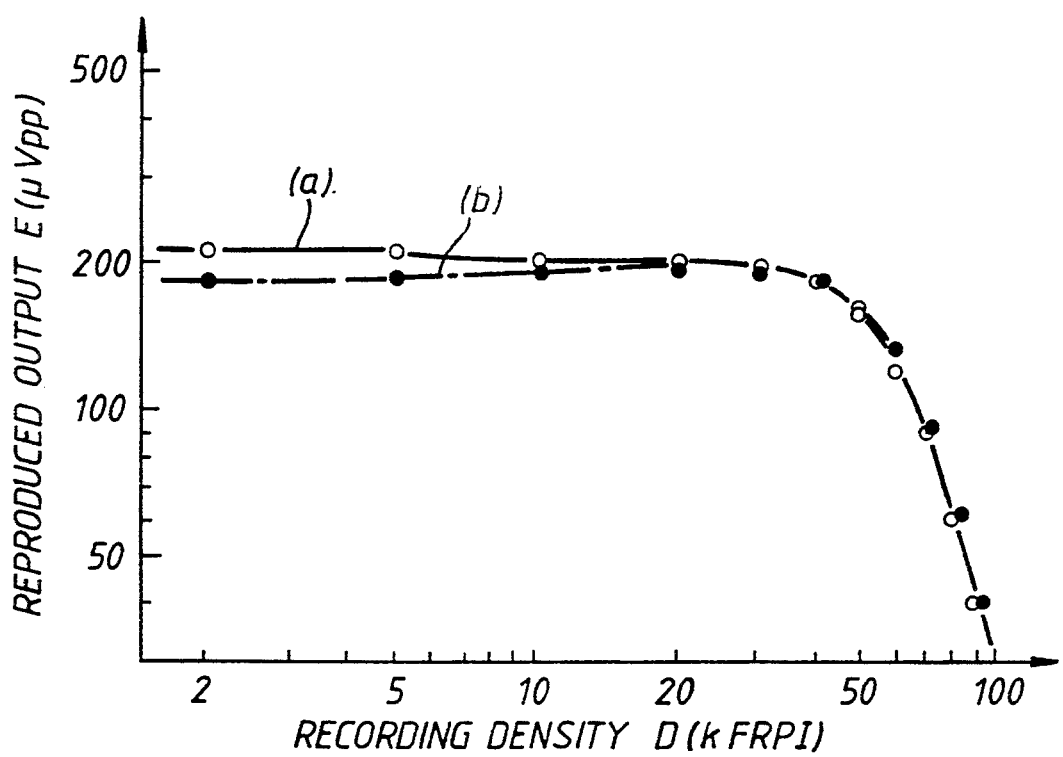
FIG. 7 is a graph illustrating the dependence characteristics of reproduced output (E) when the recording current (I) is constant, upon the recording density (D), where the ordinate represents the reproduced output (E) and the abscissa represents the recording density (D)

FIG. 7 shows the dependence characteristics of the reproduced output (E) upon the recording density (D) in the case when the recording current (I) is held constant at 18 mA. In FIG. 7, the ordinate represents the reproduced output (E), and the abscissa represents the recording density (D). Further, the curve (a) indicates the case when the system of this invention is used, and the curve (b) indicates the case when the conventional system is used.

As can be seen from FIG. 7, the reproduced output in the short-wavelength region obtained by use of the system of this invention is substantially the same as that in a conventional system which employs a magnetic recording head whose trailing edge side is constituted by a metal film having a highly-saturated magnetic flux density.

As an experiment, the magnetic recording medium having a magnetic layer of 1.9 $\mu$m thick was replaced with a magnetic recording medium having a magnetic layer of 0.15 $\mu$m thick. As a result, an optimum recording current (I') did not coincide with the recording current (I) such that the reproduced waveform parameter ($\theta$) exists in the range of $-20°$ through $+20°$.

It is preferable for ease of the system design that the margin of the reproduced waveform parameter ($\theta$) in the actual recording exists in the range of $-20°$ through $+20°$. Therefore, it can be understood that the significant advantages of this invention can be obtained when the thickness of the magnetic layer of the medium is greater than the value obtained by subtracting 0.2 $\mu$m from the gap distance.

As described above, according to the magnetic recording system of this invention, the high-density magnetic recording equivalent to that in the perpendicular magnetic recording system can be performed. Further, the phase in the recording can be adjusted by merely changing the value of the recording current. Thus, the waveform of the reproduced output can be selectively determined. Particularly, when the magnetic recording is performed by use of the recording current being adjusted in such a manner that the reproduced waveform parameter ($\theta$) becomes substantially zero, a single-peak longitudinal waveform can be reproduced by use of a simple reproducing system.

Further, when the thickness of the magnetic layer of the medium is determined to be greater than the value obtained by subtracting 0.2 $\mu$m from the gap distance of the head, the reproduced waveform parameter ($\theta$) can be controlled by the recording current value by which a high output can be obtained.

Dependence Characteristics of Reproduced Output upon Recording Current

Figure 8:
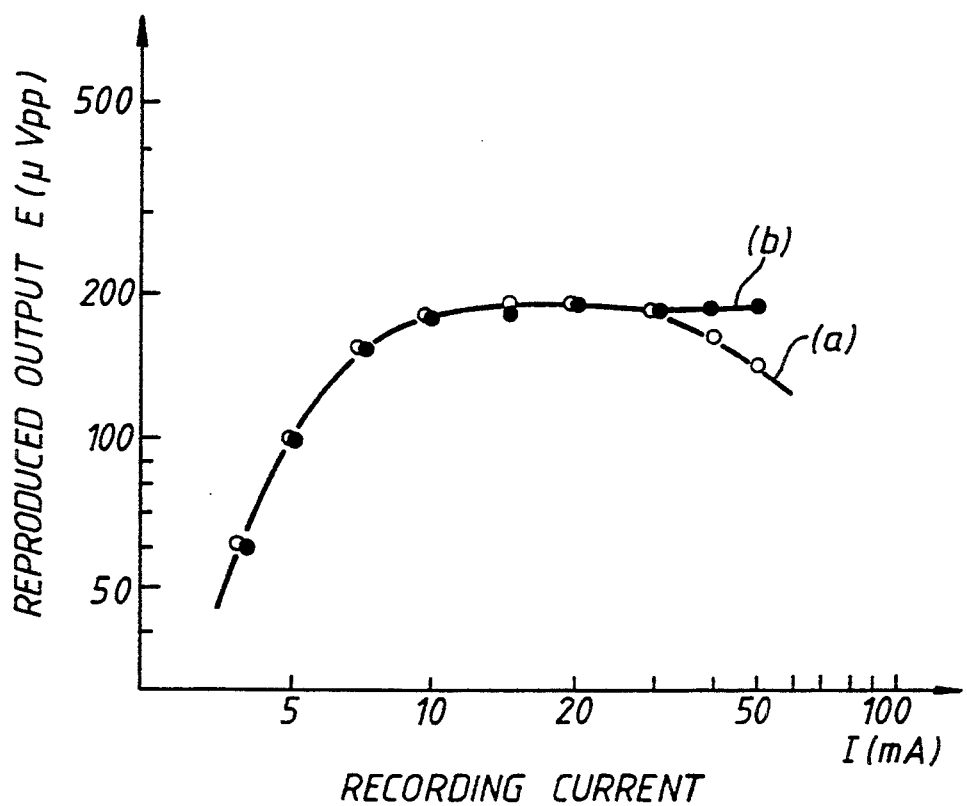
FIG. 8 is a graph illustrating the dependence characteristics of reproduced output (E) when the recording density (D) is constant, upon the recording current (I), where the ordinate represents the reproduced output (E) and the abscissa represents the recording current (I)

FIG. 8 shows the dependence characteristics of the reproduced output (E) upon the recording current (I) in the case when the recording density (D) is held constant at 35K FRPI. In FIG. 8, the ordinate represents the reproduced output (E), and the abscissa represents the recording current (I). Further, the curve (a) indicates the case when the system of this invention is used, and the curve (b) indicates the case when the conventional system is used. As can be seen from FIG. 8, both cases (a) and (b) are substantially identical to each other in that the reproduced output (E) can be maintained at a high level with respect to the variation of the recording current (I).

As described above, according to the system of this invention, the reproduced output (E) can be obtained at substantially the same level as in the conventional system even when the recording density (D) or the recording current (I) has been arbitrarily changed.

Peak Shift

Figure 9:
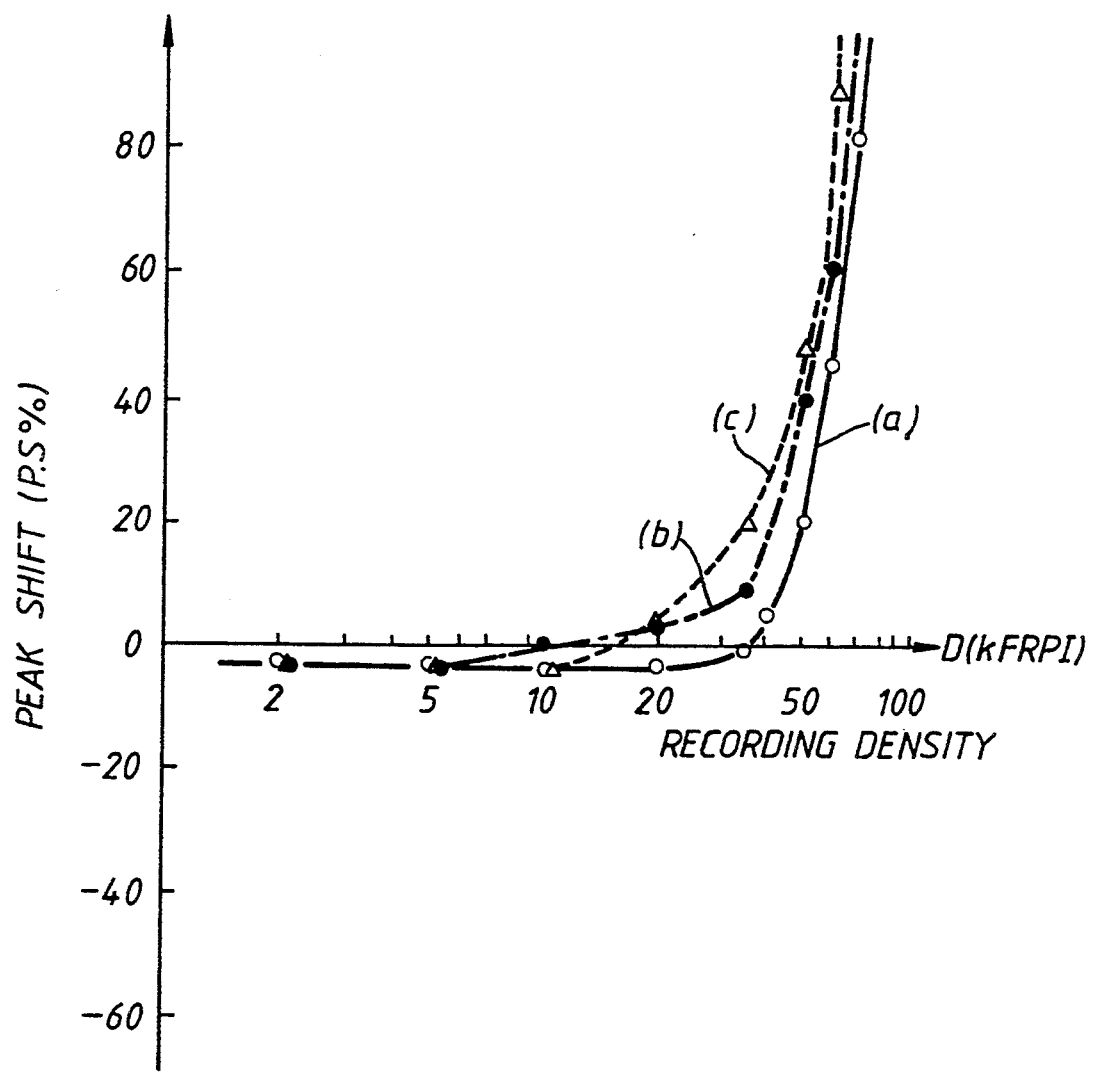
FIG. 9 is a graph illustrating the dependence characteristics of the peak shift of a 2-bit pattern upon the recording density (D), where the ordinate represents the peak shift of the 2-bit pattern and the abscissa represents the recording density (D)

FIG. 9 shows the peak shift (P.S) versus the recording density (D) in the case when a 2-bit pattern having the recording density D) of 35K FRPI was recorded. In FIG. 9, the ordinate represents the peak shift (P.S), and the abscissa represents the recording density (D). The curve (a) indicates the peak shift in the case when the system of this invention was used, the curve (b) indicates the peak shift in the case when the conventional system was used, and the curve (c) indicates the peak shift in the case when the reproduced waveform obtained from the conventional system was converted into a longitudinal waveform.

In the case when the system of this invention was used, the 2-bit pattern signal was recorded with the recording density (D) of 35K FRPI by use of the recording current (I) such that the reproduced waveform parameter ($\theta$) becomes 0°. Further, the bit detection was performed by obtaining the differential zero-crossing point so as to indicate the peak shift (P.S). In the case when the conventional system was used, the same recording current as that in the system of this invention was used, and the bit detection was performed by obtaining the zero-crossing point.

As can be seen from FIG. 9, in the case when the system of this invention was used, even when high-density recording with a recording density (D)=50K FRPI was performed, the peak shift (P.S) was significantly suppressed as compared to the case of the conventional system or to the case of using the Hilbert filter. Therefore, the system of this invention can be regarded as the most suitable system for high-density recording.

Dependence Characteristics upon Media

Various experiments have been made on the recording/reproducing characteristics of magnetic disks of various kinds having different coercive forces (Hc) and perpendicular squareness ratios (SQR).

Figure 10:
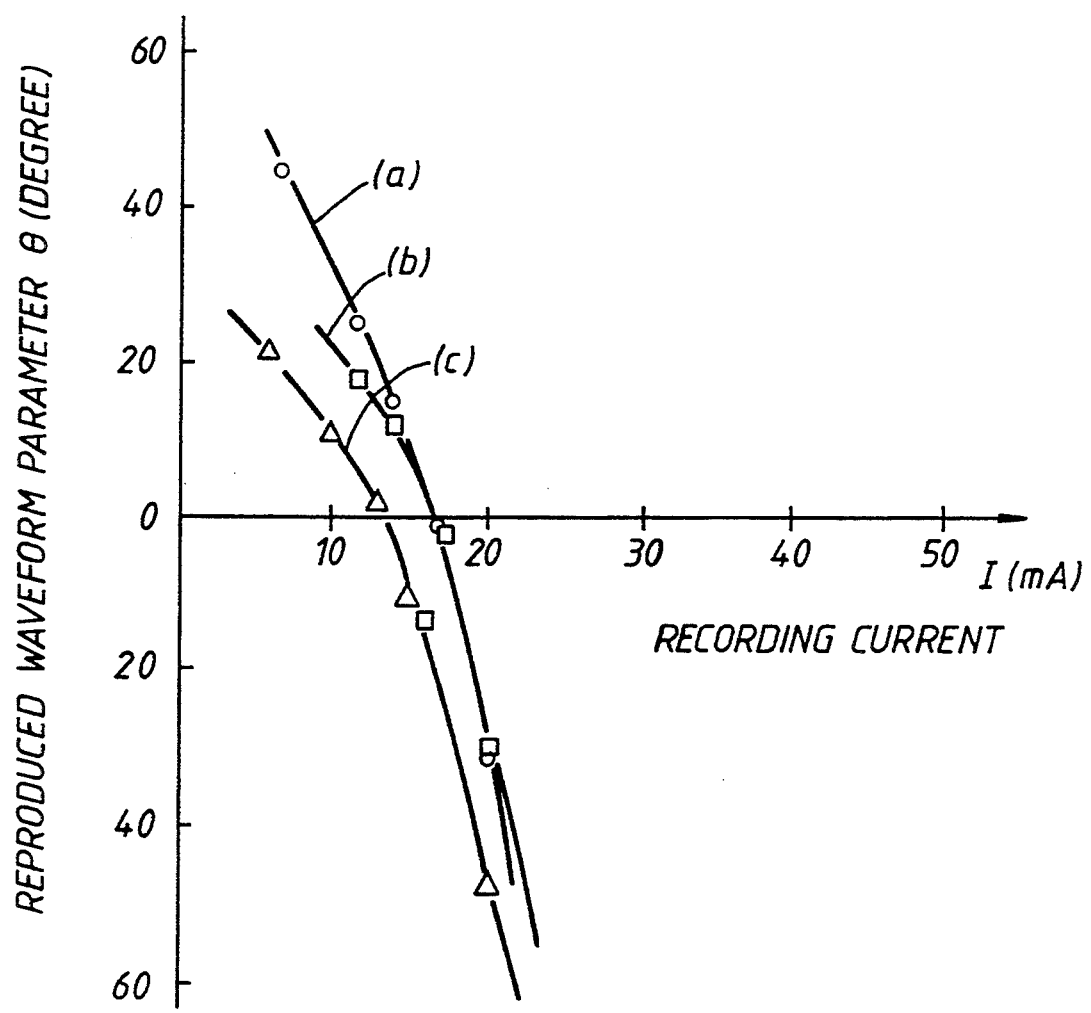
FIG. 10 is a graph illustrating the recording current (I) versus reproduced waveform parameter ($\theta$) characteristics when media having different perpendicular squareness ratios are used, where the ordinate represents the reproduced waveform parameter ($\theta$) and the abscissa represents the recording current (I)

FIG. 10 shows the dependence characteristics of the reproduced waveform parameter ($\theta$) upon the recording current (I) in the cases of three different magnetic disks. In FIG. 10, the ordinate represents the reproduced waveform parameter ($\theta$), and the abscissa represents the recording current (I). The three different magnetic disks have the same coercive force (Hc) of 520±15 Oe, but are different in their perpendicular squareness ratio (SQR), which are 0.80 (curve (a)), 0.69 (curve (b)), and 0.55 (curve (c)), respectively.

Figure 11:
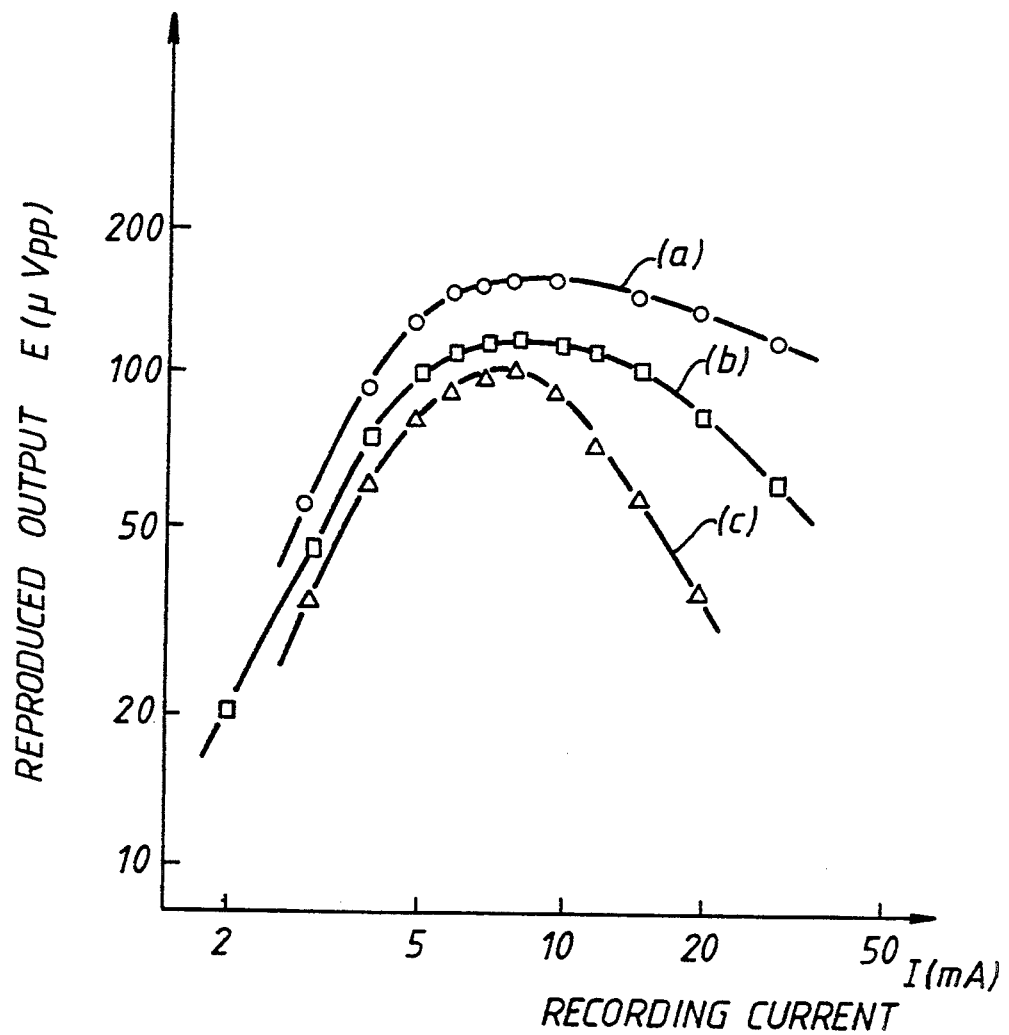
FIG. 11 is a graph illustrating the dependence characteristics of reproduced output (E) upon the recording current (I) when the recording density (D) is constant while the media having different perpendicular squareness ratios are used, where the ordinate represents the reproduced output (E) and the abscissa represents the recording current (I)

FIG. 11 shows the reproduced output characteristics in the cases of three different magnetic disks. In FIG. 11, the ordinate represents the reproduced output (E), and the abscissa represents the recording current (I). The three different magnetic disks have the same coercive force (Hc) of 520±15 Oe, but are different in their perpendicular squareness ratios (SQR), which are 0.80 (curve (a)), 0.69 (curve (b)), and 0.55 (curve (c)), respectively.

As can be seen from FIG. 10 and FIG. 11, in the case when the magnetic coercive forces (Hc) are as small as 520 Oe and the perpendicular squareness ratios (SQR) are as small as 0.55, i.e., in the case indicated by the curve (c), the value of the recording current (I) at which the maximum output was obtained (see FIG. 11) deviates from the value of the recording current (I) at which the reproduced waveform parameter ($\theta$) became 0° (see FIG. 10). In other words, at the value of the recording current (I) at which the reproduced waveform parameter ($\theta$) become 0° (see FIG. 10), the reproduced output (E) was decreased (see FIG. 11).

Figure 12:
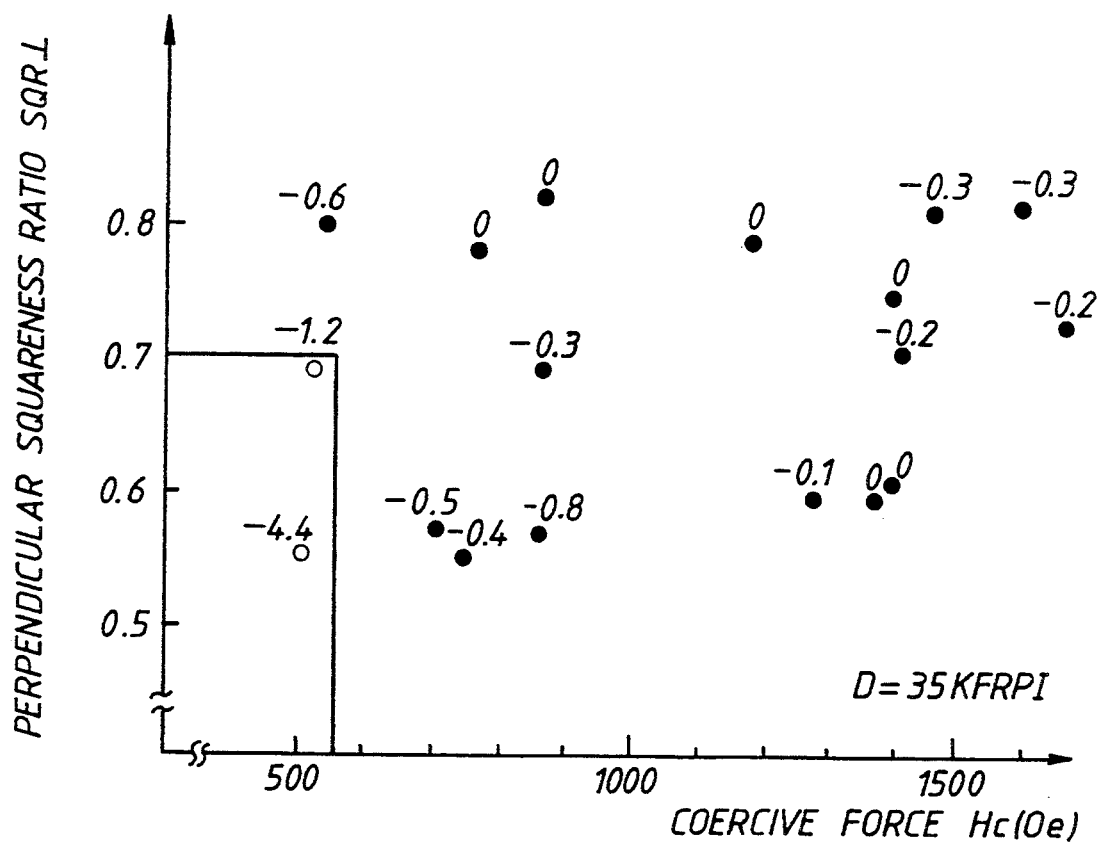
FIG. 12 is a graph illustrating the decrease of reproduced output when the reproduced waveform parameter (θ) is 0°, where the ordinate represents the perpendicular squareness ratio and the abscissa represents the coercive force of media.

FIG. 12 shows whether or not various magnetic disks can be applied to the system of this invention. In FIG. 12, the ordinate represents the perpendicular squareness ratio (SQR), and the abscissa represents the coercive force (Hc). In this experiment, various Ba-ferrite magnetic disks having coercive forces (Hc) in a range of 505 through 1460 Oe and perpendicular squareness ratios (SQR) in a range of 0.55 through 0.82 were used as the recording media.

In FIG. 12, numerals adjacent the respective plotted points represent the relative values of the reproduced outputs (E) with respect to the maximum outputs (E max), the reproduced outputs (E) being obtained at the values of the recording current (I) at which the reproduced waveform parameters ($\theta$) became 0°.

As can be seen from FIG. 12, in the system of this invention, it is particularly preferable to use a medium which satisfactorily has either a coercive force (Hc) of 550 Oe at a minimum, or a perpendicular squareness ratio (SQR) of 0.7 at a minimum.

The use of a medium, which has either a coercive force (Hc) of 550 Oe at a minimum or a perpendicular squareness ratio (SQR) of 0.7 at a minimum, can achieve a substantially ideal longitudinal waveform only with an output loss of 1dB at a maximum from the maximum output (E max) of the medium.

Next, the results in the case when a longitudinally-oriented metal-coated medium having a coercive force of 1550 Oe and a small perpendicular squareness ratio was used will be described.

Figure 13:
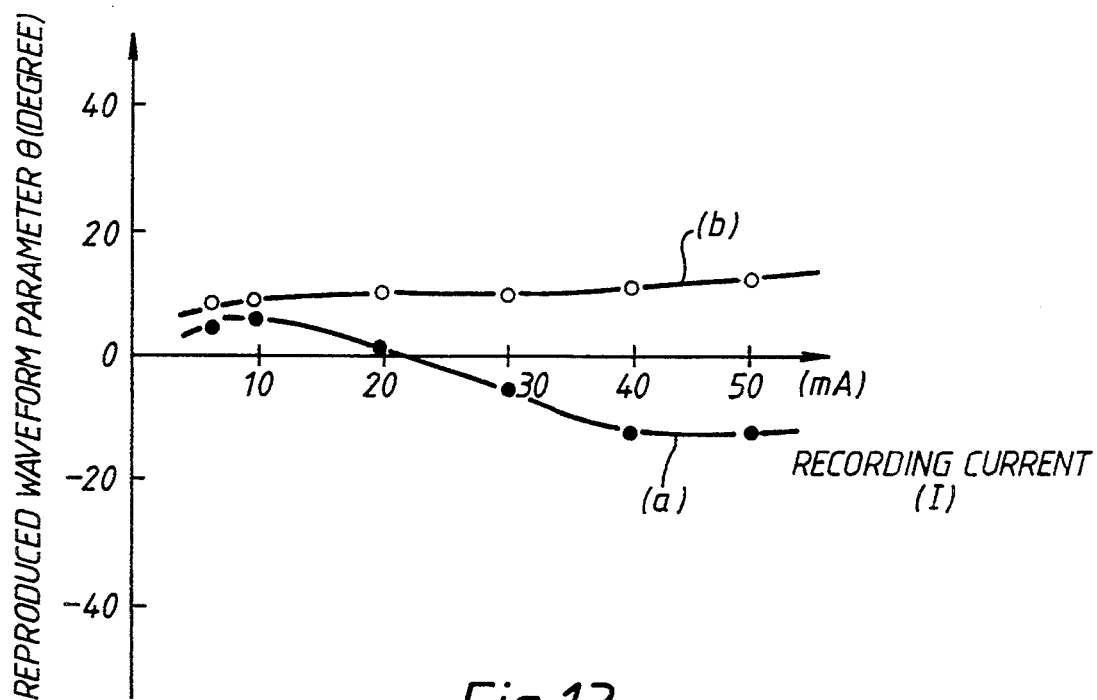
FIG. 13 is a graph illustrating the recording current (I) versus reproduced waveform parameter (θ) characteristics when different metal media are used.

FIG. 13 shows the dependence characteristics of the reproduced waveform parameter ($\theta$) upon the recording current (I). In FIG. 13, the ordinate represents the reproduced waveform parameter ($\theta$), and the abscissa represents the recording current (I). Further, the curve (a) indicates the case when the medium was applied to the system of this invention, and the curve (b) indicates the case when the medium was applied to the conventional system.

As can be seen from FIG. 13, even in the case when the longitudinally-oriented metal-coated medium was used, there existed the value of the recording current (I) at which the perpendicular waveform parameter ($\theta$) became 0°, and this value was present in the vicinity of the value at which the maximum output (E max) was obtained.

Further, it has been confirmed that in the case of the longitudinally-oriented metal-coated medium, the longitudinal magnetization dominates the perpendicular magnetization. Thus, without use of the system of this invention, a single-peak reproduced waveform can be obtained. Further, it has been also confirmed that by use of the system of this invention, there can be obtained a single-peak reproduced waveform being improved significantly in terms of symmetry.

Dependence Characteristics upon Magnetic Heads

Next, the results in the cases when various magnetic heads were used in the recording system of this invention will be described with reference to the following examples.

EXAMPLE 1

In this example, the same magnetic recording system as the system of FIG. 4 was used except that the magnetic head differed from that in the system of FIG. 4 in the following manner. Specifically, the magnetic head in this example was such that a 0.45-μm nonmagnetic gap member 13 was formed by sputtering a high-magnetic flux density alloy of Fe, Zr and N, as the high-magnetic flux density member 9.

In this example, there was also obtained a single-peak reproduced waveform being as significantly symmetrical as the waveform shown in FIG. 5(a).

EXAMPLE 2

In this example, the magnetic recording system was also the same as the system of FIG. 4 except that the magnetic head 1 differed in the following manner. Specifically, a 0.7-μm gap member was formed by sputtering Sendust metal on the leading edge side of the second ferrite core 3. Further, the magnetic recording medium differed from that of FIG. 4 in the following manner. Specifically, a coated-type Ba-ferrite flexible disk having a coercive force of 1400 Oe and perpendicular squareness ratios of 0.57 and 0.75 was used.

In this example, there were also obtained the same results as those in the above-described embodiments. Specifically, there existed the value of the recording current (I) at which the single-peak reproduced waveform was obtained. Further, the reproduced output (E) was substantially close to the maximum at this value of the recording current (I).

Dependence Characteristics upon Recording Density

As described above, the magnetic recording system of this invention can be applied to the combination of various heads and media. Further, the system of this invention can also be applied to a significantly wide range of recording densities.

Figure 14:
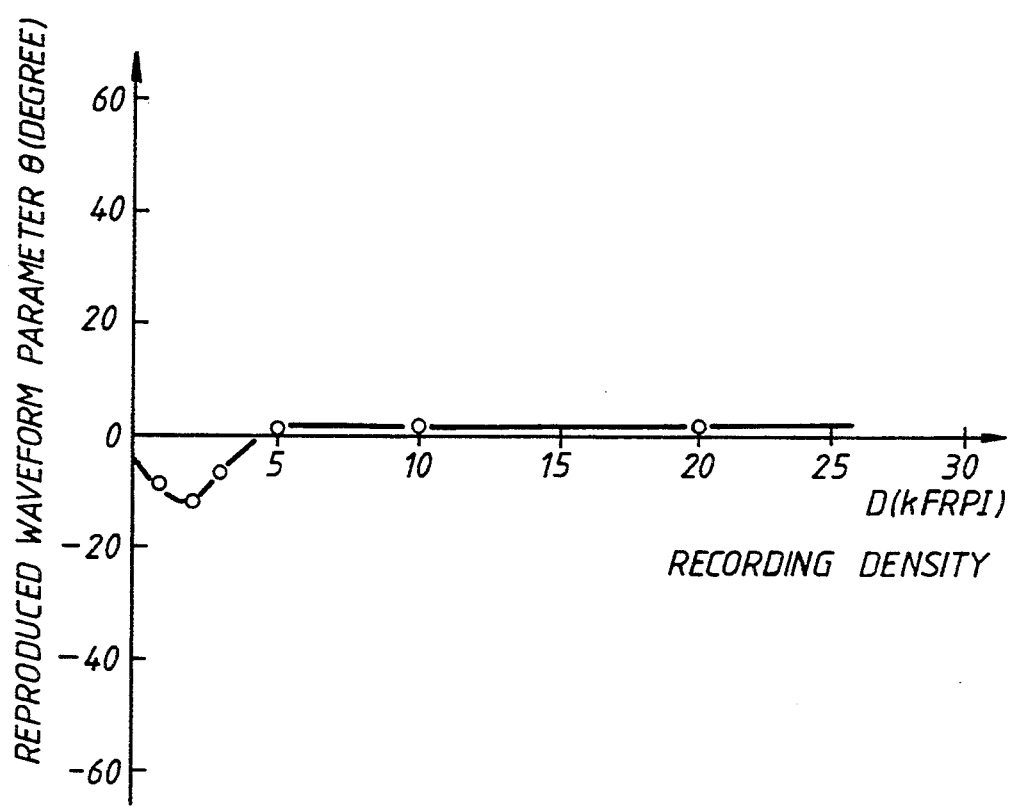
FIG. 14 is a graph illustrating the recording density (D) versus reproduced waveform parameter (θ), where the ordinate represents the reproduced waveform parameter (θ) and the abscissa represents the recording density (D)

FIG. 14 shows the dependence characteristics of the reproduced waveform parameter ($\theta$) upon the recording density (D). In FIG. 14, the ordinate represents the reproduced waveform parameter ($\theta$), and the abscissa represents the recording density (D). In this case, the magnetic recording system of this invention shown in FIG. 4 was used. As can be seen from FIG. 14, according to the system of this invention, the reproduced waveform parameter ($\theta$) can be approximately 0° over a significantly wide range of the recording densities (D), whereby the single-peak reproduced waveform can be realized.

Assume that the reproduced waveform parameter ($\theta$) is particularly required to be accurately constant independently of the recording density (D). In this case, the system of this invention can cause the recording current (I) to be controlled as a function of the recording density (D), whereby reproduced wave:forms having necessary phase characteristics can be obtained.

As described above, according to the magnetic recording system of this invention, the reproduced waveform parameter ($\theta$) can be reduced to substantially 0° by determining the recording current (I) to be in a prescribed range, whereby a single-peak longitudinal reproduced waveform can be obtained. Further, according to the recording system of this invention, the same reproduced output as that in the conventional system can be naturally obtained and, moreover, its peak shift is significantly small. Thus, the system of this invention is most suitable for high-density recording.

Further, according to the recording system of this invention the information can be detected by use of a simple signal-processing device, i.e., without use of the costly signal-processing device used in the conventional system.

Moreover, the recording system of this invention can be advantageously applied to the combination of various magnetic heads and magnetic recording media. Further, the system of this invention can perform satisfactory high-density recording without significant restrictions to the specifications of magnetic heads and magnetic recording media.

Next, one embodiment of a recording circuit based on the magnetic recording system of this invention will be described with reference to FIG. 15.

Figure 15:
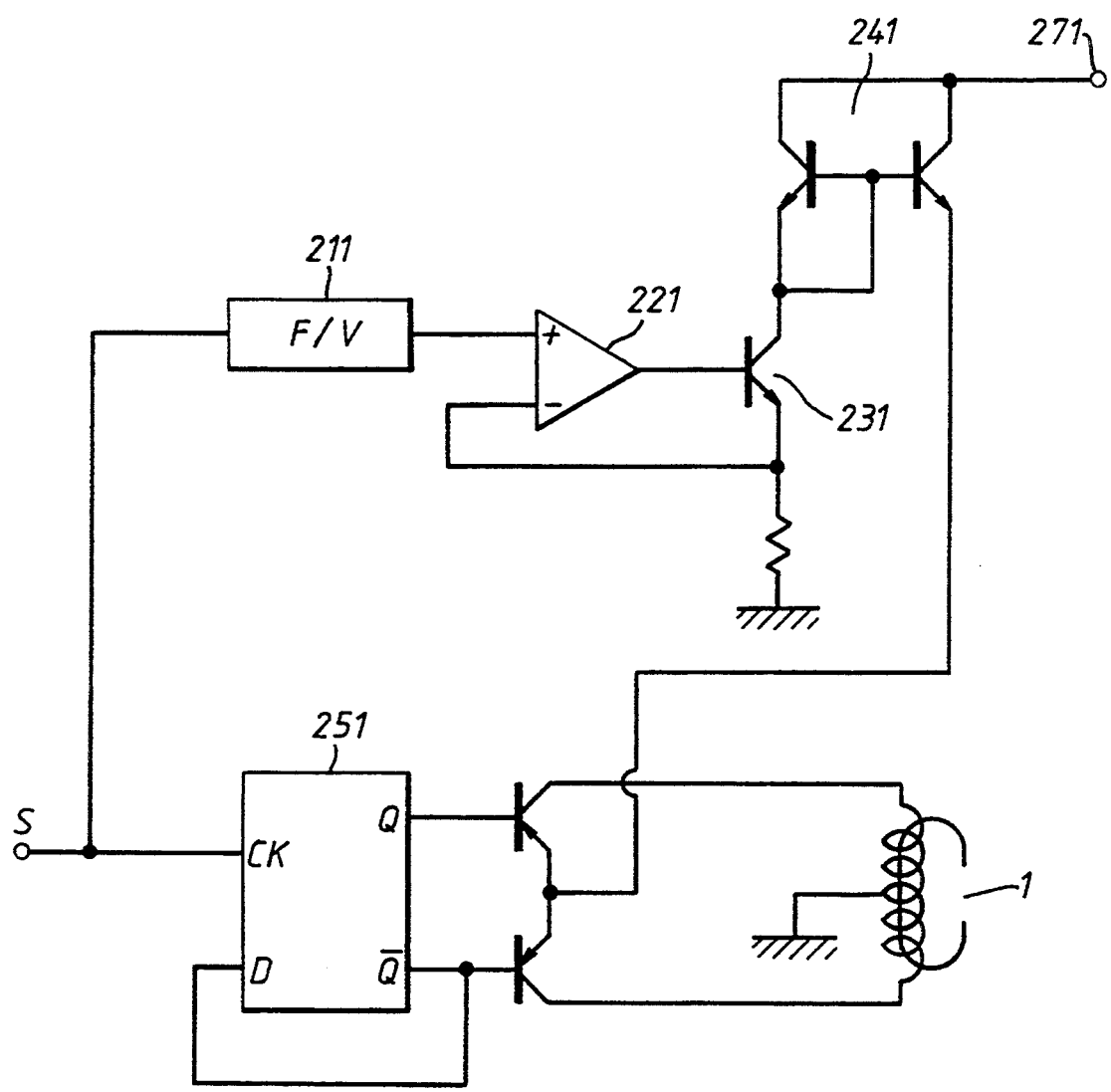
FIG. 15 is a circuit diagram illustrating one example of the recording circuit according to the present invention.

FIG. 15 is a circuit diagram illustrating an example of a magnetic recording circuit. In FIG. 15, a magnetic recording circuit 201 comprises an F/V converter 211, a buffer 221, a transistor 231, a current mirror circuit (constant current-supply circuit) 241, a flip-flop circuit (current-switching circuit) 251, a magnetic head 1 and a power source 271.

The F/V converter (frequency-voltage converter) 211 receives a signal S to be recorded, and produces a voltage corresponding to the frequency of the received signal S. The thus produced voltage is fed through the buffer 221 into the base of the transistor 231 so as to adjust the recording current (I). As a result, the recording current (I), which is supplied from the current mirror circuit 241 into the magnetic head 1, can be varied in accordance with the frequency of the input signal (S) to be recorded.

Therefore, the recording current (I) having the optimum values for the respective frequencies of the input signals (S) can be automatically determined. As a result, a single-peak waveform can be recorded on the magnetic medium.

Figure 16:
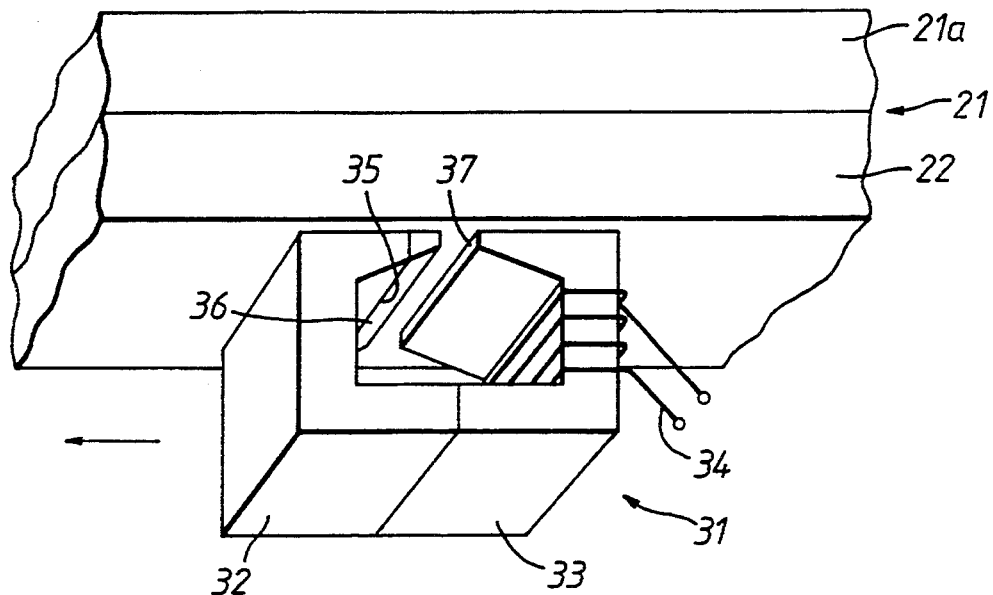
FIG. 16 is a partial perspective cross-sectional view illustrating another embodiment according to the present invention.

FIG. 16 shows a magnetic recording device of another embodiment according to the present invention. In FIG. 16, a magnetic head 31 comprises a first core 32 made of Sendust material, a second core 33 made of ferrite material, and a coil 34 wound around the second core 33. The first core 32 is disposed so as to run earlier in time than the second core 33 in terms of relative movement with respect to a magnetic recording medium 21. Further, a film 36 made of garnet is disposed on an edge 35 of the first core 32 so that a 0.4-μm gap portion is constituted.

When the magnetic recording is performed, film 36 is saturated, and then the magnetic field strength of edge 35 of first core 32 becomes greater than that of edge 37 of second core 33.

It has been confirmed that even when such magnetic head 31 is used, a longitudinal waveform can be recorded on the medium 21 as long as the recording current (I) is controlled so as to be the prescribed value. Further, in this embodiment, when recording, the apparent gap distance becomes greater due to the saturation of film 36. This is advantageous to overwriting.

Figure 17:
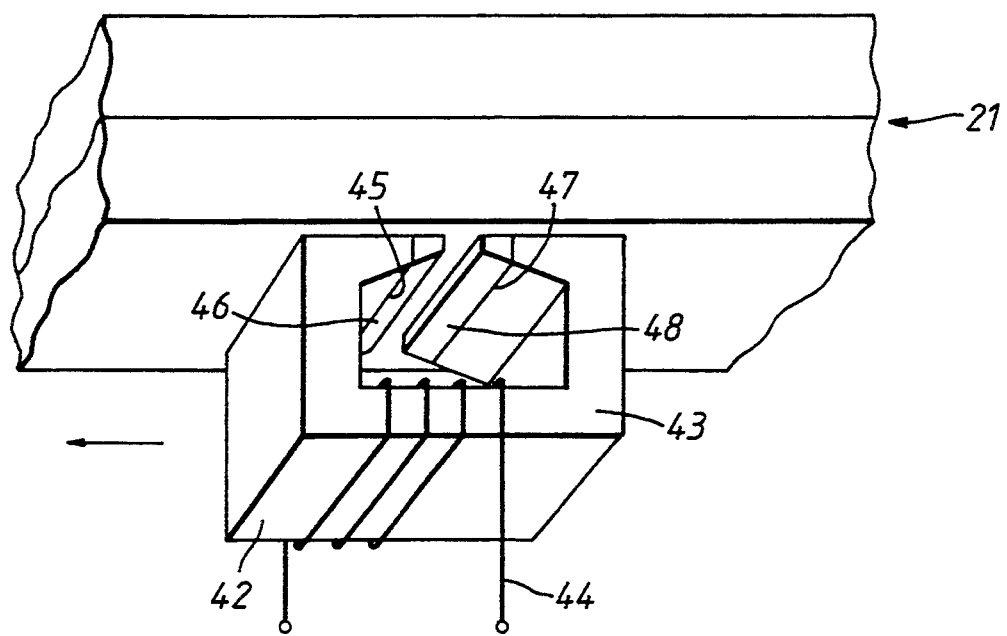
FIG. 17 is a partial perspective cross-sectional view illustrating another embodiment according to the present invention.

FIG. 17 shows a magnetic recording device of another embodiment according to the present invention. In FIG. 17, a magnetic head 41 comprises a first core 42 having a first edge 45, a second core 43 having a second edge 47, both the cores being made of Mn—Zn-ferrite material. Further, an alloy film 46 of Fe—Si—Al having a saturated magnetic flux density greater than that of first core 42 is disposed on first edge 45.

Further, a film 48 made of garnet having a saturated magnetic flux density smaller than that of second core 43 is disposed on second edge 47. The film 48 and alloy film 46 constitute a 0.4-μm gap portion. The first core 42 having a coil 44 wound therearound is disposed so as to run earlier in time than second core 43 in terms of relative movement with respect to a magnetic recording medium 21.

When recording, film 48 is saturated, and the magnetic recording is performed by alloy film 46 of first core 42 and edge 47 of second core 43. However, the magnetic field strength of alloy film 46 becomes greater than that of edge 47.

It has also been confirmed that even when the magnetic head 41 is used, a longitudinal waveform can be recorded on medium 21 as long as the recording current (I) is controlled so as to be the prescribed value.

Further, in this embodiment, when recording, the apparent gap distance becomes greater due to the saturation of film 48. This is advantageous to overwriting.

Figure 18:
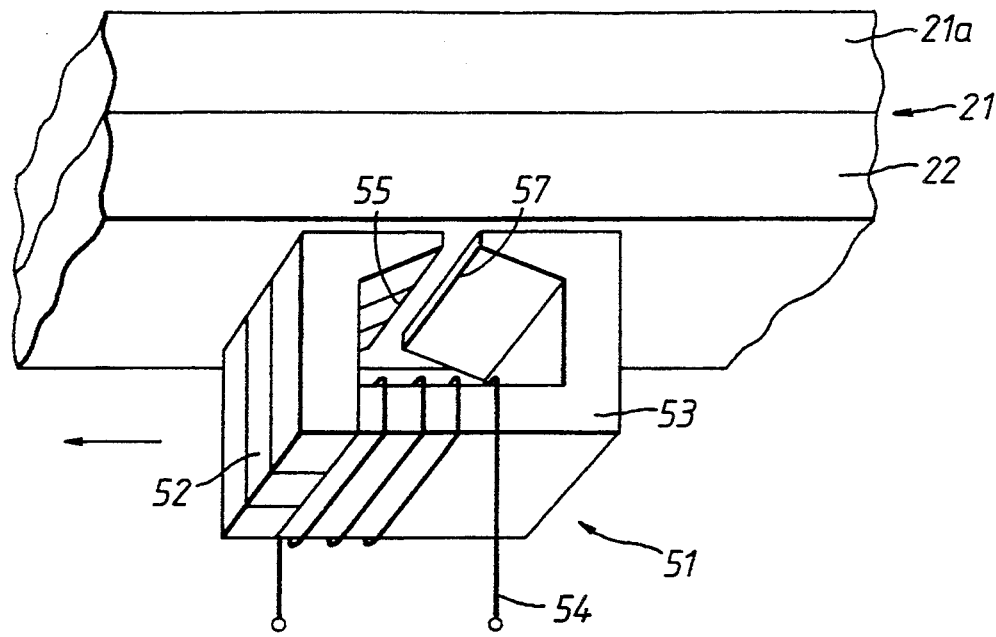
FIG. 18 is a partial perspective cross-sectional view illustrating another embodiment according to the present invention.

FIG. 18 shows a magnetic recording device of another embodiment according to the present invention. In FIG. 18, a magnetic head 51 comprises a first core 52 and a second core 53, both the cores being made of Mn—Zn-ferrite material, and a coil 54 wound around second core 53. The first core 52 is disposed so as to run earlier in time than second core 53 in terms of relative movement with respect to a medium 21.

Further, a 0.4-μm gap portion is constituted by a 5-μm-width edge 55 of first core 52 and a 15-μm-width edge 57 of second core 53, both edges 55 and 57 being opposed to each other. Thus, when recording, the magnetic field strength of edge 55 of first core 52 becomes greater than that of edge 57 of second core 53.

In this embodiment, a 3.5-inch magnetic disk 21 comprising a support layer 21a and a magnetic layer 22 provided thereon, the layer 22 consisting of plate-shaped barium-ferrite magnetic powder (a sort of hexagonal system magnetic powder) dispersed in a bonding resin was used. Further, the perpendicular squareness ratio (SQR) of magnetic disk 21 was 0.75, and the coercive force (Hc) thereof was 750 Oe.

It has also been confirmed that when the magnetic recording is performed by use of a recording current (I) of 20 mA, a single-peak longitudinal waveform can be obtained in the same manner as in the above-described embodiment. Specifically, the single-peak reproduced waveform can be obtained without use of a complicated waveform-processing device, but only by simple differential zero-crossing point detection.

It has also been confirmed that a high-reproduced output in a short-wavelength region can be accurately obtained. Further, when the gap distance of the magnetic head of the above-described .embodiment is determined to be 0.7 μm, the same advantages can be obtained. Further, when the perpendicular squareness ratio (SQR) is 0.5 at a minimum, sufficient advantages of this invention can be obtained.

Moreover, the magnetic heads of the above-described magnetic recording devices are made of the same material. Thus, these magnetic heads can be manufactured in a simple process, and their production cost and material cost can be significantly reduced as compared to the case of a MIG (metal-in-gap) head.

Figure 19:
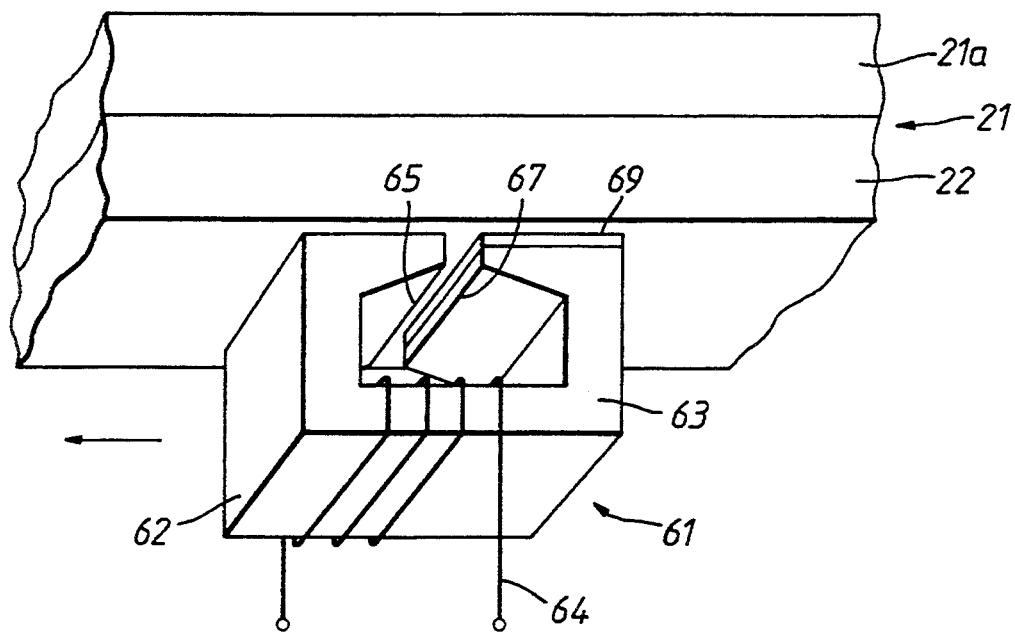
FIG. 19 is a partial perspective cross-sectional view illustrating another embodiment according to the present invention.

FIG. 19 shows a magnetic recording device of another embodiment according to the present invention. In FIG. 19, a magnetic head 61 comprises a first core 62 and a second core 63, both cores being made of Mn—Zn-ferrite material, and a coil 64 wound around first core 62. The first core 62 is arranged so as to run earlier in time than second core 63 in terms of relative movement with respect to a magnetic recording medium 21.

Further, a 0.1-μm thick portion 69 made of glass material is provided on second core 63. Thus, magnetic head 61 runs in such a manner that second core 63 is being separated from medium 21 by a distance of 0.1 μm while first core 62 is being in close contact with medium 21.

Further, a 0.4-μm gap portion is constituted by an edge 65 of first core 62 and an edge 67 of second core 63.

Therefore, when the recording is performed, the edge 65 of first core 62 can act on the medium 21 more effectively than the edge 67 of second core 63.

Specifically, the edge 65 of first core 62 provides the medium 21 with a magnetic field strength greater than that provided by the edge 67 of second core 63.

In this embodiment, the magnetic recording was performed by use of a recording current (I) of 20 mA on the same medium as that in the above-described embodiments. As a result, a single-peak reproduced waveform, being a longitudinal waveform, was obtained. Therefore, it has also been confirmed that the single-peak reproduced waveform can be accurately obtained by the simple differential zero-crossing point detection, in the same manner as in the above-described embodiments.

Moreover, in this embodiment, the cores 62 and 63 of magnetic head 61 are also made of the same material, whereby their production cost can be significantly reduced.

Figure 20:
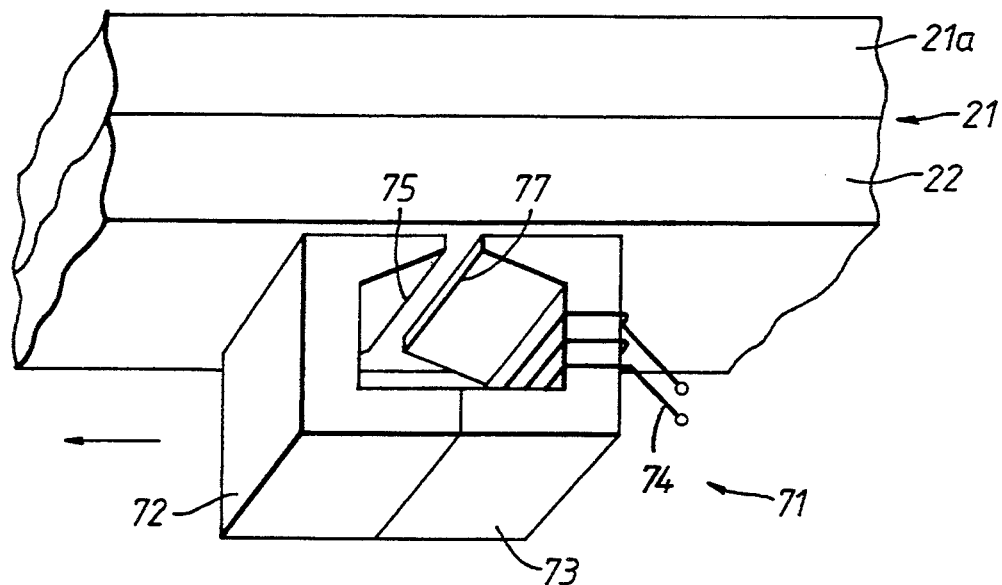
FIG. 20 is a partial perspective cross-sectional view illustrating another embodiment according to the present invention.

FIG. 20 is a schematic cross-sectional view illustrating a magnetic recording device according to one embodiment of this invention.

In FIG. 20, a magnetic head 71 comprises a first core 72 made of Sendust material, a second core 73 made of ferrite material, and a coil 74 wound around the second core 73. The first core 72 is arranged so as to run earlier in time than second core 73 in terms of relative movement with respect to a magnetic recording medium 21. The medium 21 has a support layer 21a and a magnetic layer 22 formed thereon.

Further, a 0.4-μm gap portion is constituted by a 10-μm-depth edge 75 of first core 72 and an edge 77 of second core 73. In this embodiment, when recording, the magnetic field strength of the edge 75 of first core 72 becomes greater than that of the edge 77 of second core 73.

In general, when the high-density recording is performed in a longitudinal magnetic recording system, the adverse effect of demagnetization becomes greater, whereby the high-reproduced output cannot be obtained. However, according to this embodiment, a high-reproduced output having a substantially longitudinal waveform can be obtained in the high-density region without a significant decrease of the reproduced output.

As described above, according to the magnetic recording device of this embodiment, the high-density recording can be achieved, and when reproducing, a single-peak reproduced waveform can be obtained by use of the conventional reproducing system. This is significantly advantageous to practical applications.

Further, in terms of the perpendicular squareness ratio (SQR) of the recording medium, it has been confirmed that, after various experiments other than the above-described experiments, the advantages of this invention can be obtained as long as a recording medium having the perpendicular squareness ratio (SQR) of 0.3 at a minimum or preferably 0.5 at a minimum is used.

Moreover, the magnetic heads in the above-described respective magnetic recording devices are constituted by low-cost materials such as ferrite and Sendust, whereby their production cost can be significantly reduced.

In this embodiment, the first core is made of Sendust, and the second cope is made of ferrite. However, various other metal materials, such as Permalloy, Nimalloy, Hardperm, Alperm and the like, may also be used as the material of the first core. Further, single-crystal ferrite, polycrystal ferrite and the like may also be used as the material of the second core.

Figure 21:
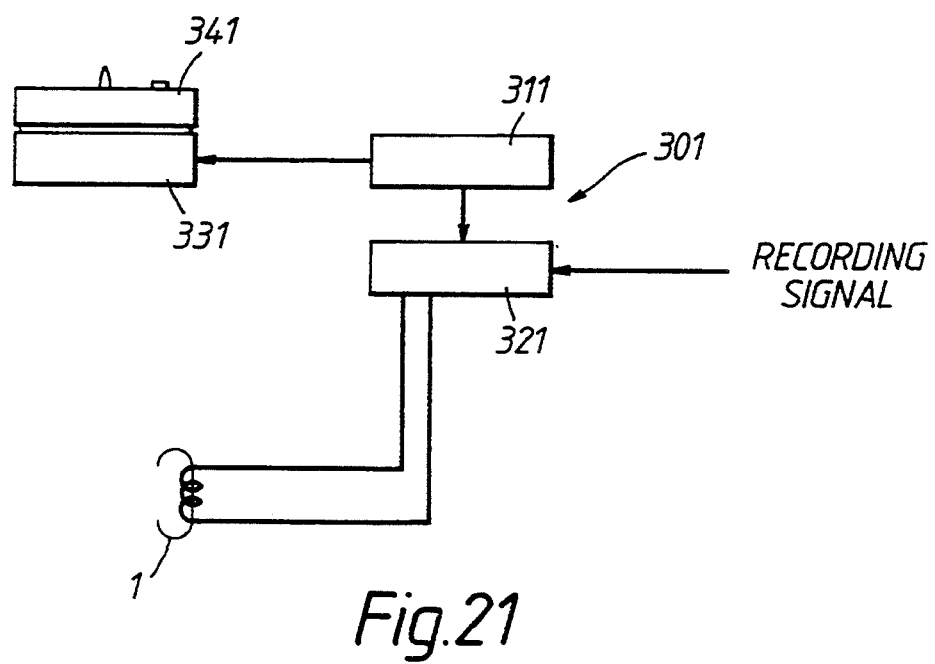
FIG. 21 is a circuit diagram for explaining another embodiment according to the present invention.
Figure 22A:
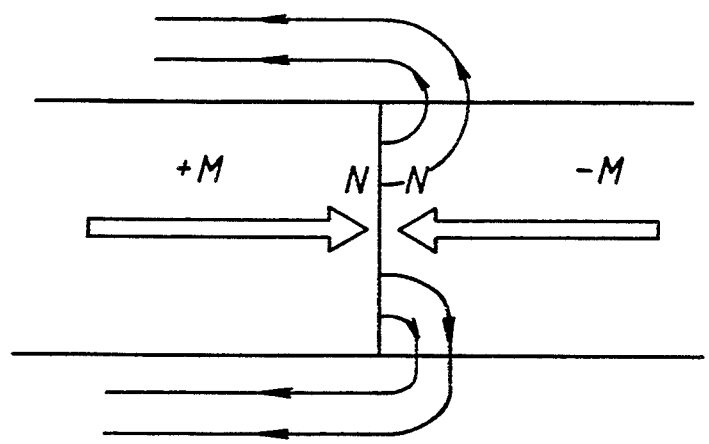
FIGS. 22(a) and 22(b) are diagrams for explaining a longitudinal recording system and a perpendicular recording system.
Figure 22B:
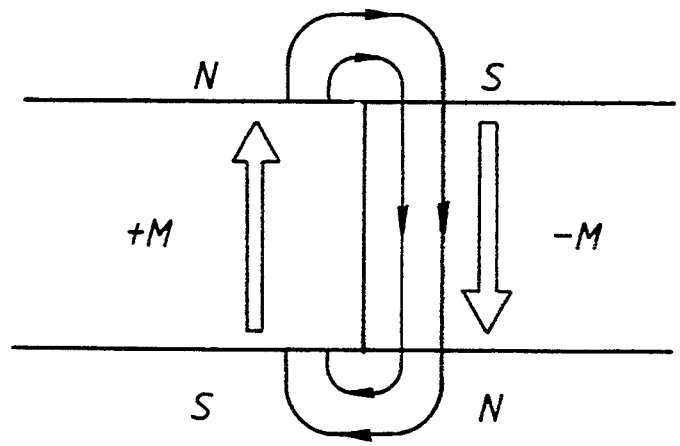
Figure 23A:
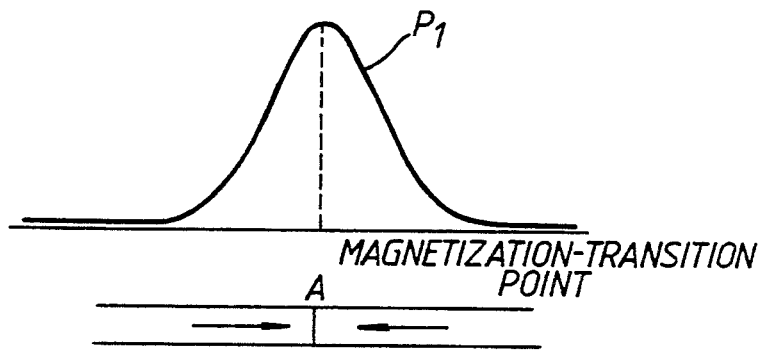
FIGS. 23(a) through 23(c) are diagrams illustrating various kinds of recording waveforms.
Figure 23B:
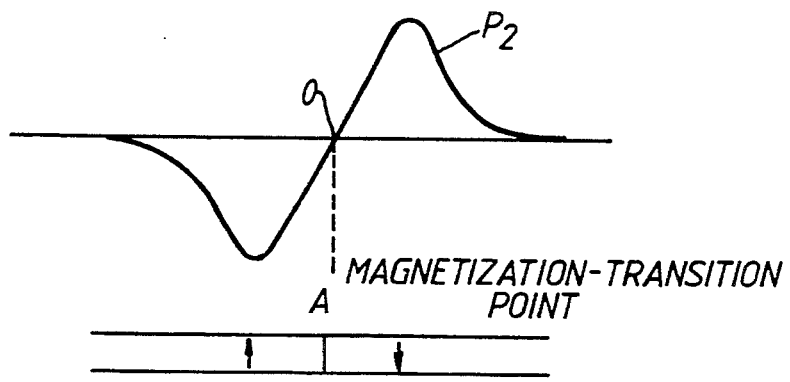
Figure 23C:
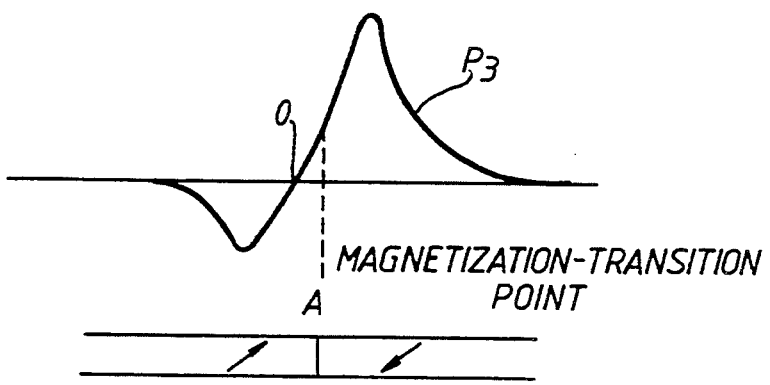

FIG. 21 shows a magnetic recording device according to one embodiment of this invention, and the device of this invention is interchangeable with the conventional device.

Specifically, when a magnetic recording medium is applied to the device of this invention, the device discriminates whether the applied medium is for perpendicular recording or for longitudinal recording. Thereafter, the device of this invention determines whether the head edge having greater effective magnetic field strength must run earlier or the head edge having smaller effective magnetic field strength must run earlier.

In FIG. 21, a magnetic recording device 301 comprises discriminating means 311, a current-generating source 321, a magnetic head 1, a motor 331, and disk-driving means 341.

In operation, when a magnetic disk is applied to the magnetic recording device 1, the discriminating means 311 discriminates whether the applied disk is for perpendicular recording or for longitudinal recording. In the case when the applied disk is for perpendicular recording, the discriminating means 311 supplies a forward current to the motor 331 so as to rotate in a forward direction. In the case when the applied disk is for longitudinal recording, discriminating means 311 supplies a reverse current to motor 331 so as to rotate in a reverse direction. Further, discriminating means 311 also supplies the signals, which serve to select the respective optimum recording currents, to the current-generating source 321. Further, the current-generating source 321 receives the input signals to be recorded from outside, and feeds the corresponding currents to magnetic head 1 so as to record the input signals on the applied disk.

In this embodiment, magnetic head 1 has the same structure as that shown in FIG. 4. Specifically, magnetic head 1 comprises a first core and a second core, both cores being made of ferrite material, and a coil wound around the first core. The first core is arranged so as to run earlier in time than the second core in relative movement with respect to the magnetic recording medium. Further, an alloy film made of Sendust material, whose saturation magnetic flux density is greater than that of the first core, is adhered to the edge of the first core. Further, a 0.4-μm gap portion is constituted by this alloy film and the edge of the second core. Thus, the edge, whose effective magnetic field strength is greater, is arranged to run earlier for recording.

Assume that a magnetic disk provided with a magnetic layer including barium-ferrite magnetic powder dispersed therein, the disk having a perpendicular squareness ratio (SQR) of 0.75 and a coercive force (Hc) of 1400 Oe, is applied to the magnetic recording device of this embodiment. Further, the perpendicular recording is performed by use of the recording current of 20 mA. In this case, a single-peak longitudinal reproduced waveform can be obtained, as shown in FIG. 5(a). This waveform is much superior to the waveform obtained by use of the Hilbert filter (see FIG. 5(c)).

Therefore, the bit detection can be easily performed by the differential zero-crossing point detection.

Next, assume that a magnetic disk for longitudinal recording is applied to the magnetic recording device of this embodiment. In this case, discriminating means 311 supplies a reverse current to motor 331 so as to rotate in a reverse direction. Thus, the head edge, whose effective magnetic field strength is smaller, is caused to run earlier for recording. This is the same recording manner as in the conventional recording system. Thus, information can be recorded on the applied disk without any other modification.

As described above, according to the magnetic recording device of this embodiment, the novel recording and the conventional recording can be interchangeably performed with each other by merely changing the rotational direction of motor 331.

Besides the above-described manner, there can also be provided a manner in which the magnetic head 1 is rotated by 180° in accordance with the signal produced from discriminating means 311.

Hereinabove, the magnetic recording has been described as to various magnetic disks. However, this invention can be applied to various magnetic recording devices in which other magnetic recording media such as magnetic tape and the like are used for recording information thereon. Thus, this invention is significantly advantageous to practical applications in various fields.

Moreover, according to the magnetic recording system of this invention, the high-density recording equivalent to that in the perpendicular recording system can be achieved, and the prescribed single-peak reproduced waveform can be easily obtained.

Obviously, numerous additional modifications and variations of the present invention are possible in light of the above teachings. It is therefore to be understood that within the scope of the appended claims, the invention may be practiced otherwise than as specifically described herein.

What is claimed is:

1. A magnetic recording system for recording information on a magnetic recording medium magnetized with a perpendicular magnetization component by a magnetic head so as to be reproduced by the magnetic head, the magnetic head comprising a leading side and a trailing side opposite the leading side, the leading side leading the trailing side in terms of motion relative to the magnetic recording medium, the magnetic recording medium comprising a magnetic layer, wherein said magnetic recording head comprises:
   means for generating a first magnetic field with a first field strength from the leading side to apply the first magnetic field to the magnetic recording medium so as to magnetize the magnetic layer of the magnetic recording medium by the first magnetic field on the leading side; and
   means for generating a second magnetic field with a second field strength from the trailing side to apply the second magnetic field to the magnetic recording medium so as to magnetize the magnetic layer of the magnetic recording medium by the second magnetic field on the trailing side, the second field strength being smaller than the first field strength, wherein different values between the first field strength and the second field strength are determined so that a reproduced waveform parameter ($\theta$) of the waveform reproduced by the magnetic reproducing head is in the range of $-20°$ through $+20°$.

2. The magnetic recording system according to claim 1, wherein the reproduced waveform parameter ($\theta$) of the waveform reproduced by the magnetic head is substantially $0°$.

3. A magnetic recording device for recording information on a magnetic recording medium for forming a perpendicular magnetization component using a ring head, said ring head being constituted by cores and a coil wound therearound, one of the cores having a leading side and the other core having a trailing side, said leading side and said trailing side being disposed to oppose each other across a prescribed gap, said device comprising:

a ring head being structured such that the magnetic field strength to be generated on said leading side is have a difference from a magnetic field strength to be generated on said trailing side; and means for determining said difference of said magnetic field strength such that a waveform reproduced by said reproducing head from a magnetization to be recorded by said device on the magnetic recording medium is a single-peak wave form, wherein the magnetic field strength on the leading side greater than the magnetic field strength on the trailing side so that a single-peak waveform is formed on the magnetic recording medium, a portion having a saturation magnetic flux density greater than that on the trailing side is disposed on said leading side and a portion having a saturation magnetic flux density smaller than that on said trailing side is disposed on said trailing side.

4. A magnetic recording device for recording information on a magnetic recording medium for forming a perpendicular magnetization component using a ring head, the ring head being constituted by cores and a coil wound therearound, one of the cores having a leading side and the other core having a trailing side, said leading side and said trailing side being disposed to oppose each other across a prescribed gap, said device comprising:

a ring head being structured such that the magnetic field strength to be generated on said leading side is caused to have a difference from a magnetic field strength to be generated on said trailing side;

discriminating means for discriminating a recording-type specification of the magnetic recording medium, and means for causing said trailing side to run earlier in time than said leading side in relative movement with respect to the magnetic recording medium depending on an output produced by said discriminating means; and means for adjusting a recording current such that a waveform to be recorded by said device on the magnetic recording medium is a single-peak waveform.

* * * * *